(12) United States Patent
Hertel

(10) Patent No.: US 12,412,538 B2
(45) Date of Patent: Sep. 9, 2025

(54) ELECTROPHORETIC DEVICE WITH AMBIENT LIGHT SENSOR AND ADAPTIVE WHITENESS RESTORING AND COLOR BALANCING FRONTLIGHT

(71) Applicant: E INK CORPORATION, Billerica, MA (US)

(72) Inventor: Dirk Hertel, Quincy, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/731,572

(22) Filed: Jun. 3, 2024

(65) Prior Publication Data
US 2025/0006144 A1    Jan. 2, 2025

Related U.S. Application Data

(60) Provisional application No. 63/523,487, filed on Jun. 27, 2023.

(51) Int. Cl.
*G09G 3/34* (2006.01)

(52) U.S. Cl.
CPC .......... *G09G 3/344* (2013.01); *G09G 3/3413* (2013.01); *G09G 2300/0452* (2013.01); *G09G 2320/0242* (2013.01); *G09G 2320/0646* (2013.01); *G09G 2320/0666* (2013.01); *G09G 2360/144* (2013.01); *G09G 2360/16* (2013.01)

(58) Field of Classification Search
CPC ... G09G 2300/0452; G09G 2320/0242; G09G 2320/0646; G09G 2320/0666; G09G 2320/062; G09G 2360/144; G09G 2360/16; G09G 2380/14; G02F 1/167
See application file for complete search history.

(56) References Cited

U.S. PATENT DOCUMENTS

| | | |
|---|---|---|
| 4,418,346 A | 11/1983 | Batchelder |
| 5,852,196 A | 12/1998 | Hou |
| 5,872,552 A | 2/1999 | Gordon, II et al. |
| 5,930,026 A | 7/1999 | Jacobson et al. |
| 6,017,584 A | 1/2000 | Albert et al. |
| 6,130,774 A | 10/2000 | Albert et al. |
| 6,144,361 A | 11/2000 | Gordon, II et al. |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,545,797 B2 | 4/2003 | Chen et al. |
| 6,664,944 B1 | 12/2003 | Albert et al. |

(Continued)

OTHER PUBLICATIONS

European Patent Office, "International Search Report and Written Opinion", PCT/US2024/032219, Sep. 10, 2024.

(Continued)

*Primary Examiner* — Christopher E Leiby
(74) *Attorney, Agent, or Firm* — Rajesh Vallabh

(57) ABSTRACT

An electrophoretic display apparatus includes an ambient light sensor and a frontlight system for adaptively restoring whiteness and balancing color on the display.

19 Claims, 17 Drawing Sheets
(4 of 17 Drawing Sheet(s) Filed in Color)

(56) References Cited

U.S. PATENT DOCUMENTS

| | | |
|---|---|---|
| 6,672,921 B1 | 1/2004 | Liang et al. |
| 6,693,620 B1 | 2/2004 | Herb et al. |
| 6,753,999 B2 | 6/2004 | Zehner et al. |
| 6,788,449 B2 | 9/2004 | Liang et al. |
| 6,788,452 B2 | 9/2004 | Liang et al. |
| 6,825,970 B2 | 11/2004 | Goenaga et al. |
| 6,842,279 B2 | 1/2005 | Amundson |
| 6,862,128 B2 | 3/2005 | Katase |
| 6,864,875 B2 | 3/2005 | Drzaic et al. |
| 6,866,760 B2 | 3/2005 | Paolini, Jr. et al. |
| 6,900,851 B2 | 5/2005 | Morrison et al. |
| 6,914,714 B2 | 7/2005 | Chen et al. |
| 6,922,276 B2 | 7/2005 | Zhang et al. |
| 6,972,893 B2 | 12/2005 | Chen et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,167,155 B1 | 1/2007 | Albert et al. |
| 7,170,670 B2 | 1/2007 | Webber |
| 7,176,880 B2 | 2/2007 | Amundson et al. |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,385,751 B2 | 6/2008 | Chen et al. |
| 7,408,699 B2 | 8/2008 | Wang et al. |
| 7,411,719 B2 | 8/2008 | Paolini, Jr. et al. |
| 7,453,445 B2 | 11/2008 | Amundson |
| 7,492,339 B2 | 2/2009 | Amundson |
| 7,492,505 B2 | 2/2009 | Liang et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,667,684 B2 | 2/2010 | Jacobson et al. |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,684,108 B2 | 3/2010 | Wang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,791,789 B2 | 9/2010 | Albert et al. |
| 7,800,813 B2 | 9/2010 | Wu et al. |
| 7,821,702 B2 | 10/2010 | Liang et al. |
| 7,839,564 B2 | 11/2010 | Whitesides et al. |
| 7,859,742 B1 | 12/2010 | Chiu et al. |
| 7,910,175 B2 | 3/2011 | Webber |
| 7,952,557 B2 | 5/2011 | Amundson |
| 7,952,790 B2 | 5/2011 | Honeyman et al. |
| 7,956,841 B2 | 6/2011 | Albert et al. |
| 7,982,479 B2 | 7/2011 | Wang et al. |
| 7,982,941 B2 | 7/2011 | Lin et al. |
| 7,999,787 B2 | 8/2011 | Amundson et al. |
| 8,009,348 B2 | 8/2011 | Zehner et al. |
| 8,040,594 B2 | 10/2011 | Paolini, Jr. et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,159,636 B2 | 4/2012 | Sun et al. |
| 8,174,490 B2 | 5/2012 | Whitesides et al. |
| 8,213,076 B2 | 7/2012 | Albert et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,363,299 B2 | 1/2013 | Paolini, Jr. et al. |
| 8,373,649 B2 | 2/2013 | Low et al. |
| 8,384,658 B2 | 2/2013 | Albert et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,456,414 B2 | 6/2013 | Lin et al. |
| 8,462,102 B2 | 6/2013 | Wong et al. |
| 8,466,852 B2 | 6/2013 | Drzaic et al. |
| 8,503,063 B2 | 8/2013 | Sprague |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,576,470 B2 | 11/2013 | Paolini, Jr. et al. |
| 8,576,475 B2 | 11/2013 | Huang et al. |
| 8,576,476 B2 * | 11/2013 | Telfer ................. G02F 1/16757 345/107 |
| 8,593,396 B2 | 11/2013 | Amundson et al. |
| 8,593,721 B2 | 11/2013 | Albert et al. |
| 8,605,032 B2 | 12/2013 | Liu et al. |
| 8,605,354 B2 | 12/2013 | Zhang et al. |
| 8,643,595 B2 | 2/2014 | Chung et al. |
| 8,649,084 B2 | 2/2014 | Wang et al. |
| 8,665,206 B2 | 3/2014 | Lin et al. |
| 8,670,174 B2 | 3/2014 | Sprague et al. |
| 8,681,191 B2 | 3/2014 | Yang et al. |
| 8,690,408 B2 | 4/2014 | Li |
| 8,704,756 B2 | 4/2014 | Lin |
| 8,717,664 B2 | 5/2014 | Wang et al. |
| 8,730,153 B2 | 5/2014 | Sprague et al. |
| 8,749,538 B2 * | 6/2014 | Webster ............... G09G 3/3466 345/207 |
| 8,786,935 B2 | 7/2014 | Sprague |
| 8,797,634 B2 | 8/2014 | Paolini, Jr. et al. |
| 8,810,525 B2 | 8/2014 | Sprague |
| 8,810,899 B2 | 8/2014 | Sprague et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,928,562 B2 | 1/2015 | Gates et al. |
| 8,928,641 B2 | 1/2015 | Chiu et al. |
| 8,964,282 B2 | 2/2015 | Wang et al. |
| 8,976,444 B2 | 3/2015 | Zhang et al. |
| 9,013,394 B2 | 4/2015 | Lin |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |

(56) References Cited

U.S. PATENT DOCUMENTS

| | | | |
|---|---|---|---|
| 9,082,352 B2 | 7/2015 | Cheng et al. | |
| 9,116,412 B2 | 8/2015 | Lin | |
| 9,146,439 B2 | 9/2015 | Zhang | |
| 9,164,207 B2 | 10/2015 | Honeyman et al. | |
| 9,170,467 B2 | 10/2015 | Whitesides et al. | |
| 9,170,468 B2 | 10/2015 | Lin et al. | |
| 9,171,508 B2 | 10/2015 | Sprague et al. | |
| 9,182,646 B2 | 11/2015 | Paolini, Jr. et al. | |
| 9,195,111 B2 | 11/2015 | Anseth et al. | |
| 9,199,441 B2 | 12/2015 | Danner | |
| 9,218,773 B2 | 12/2015 | Sun et al. | |
| 9,224,338 B2 | 12/2015 | Chan et al. | |
| 9,224,342 B2 | 12/2015 | Lin et al. | |
| 9,224,344 B2 | 12/2015 | Chung et al. | |
| 9,230,492 B2 | 1/2016 | Harrington et al. | |
| 9,251,736 B2 | 2/2016 | Lin et al. | |
| 9,262,973 B2 | 2/2016 | Wu et al. | |
| 9,268,191 B2 | 2/2016 | Paolini, Jr. et al. | |
| 9,269,311 B2 | 2/2016 | Amundson | |
| 9,279,906 B2 | 3/2016 | Kang | |
| 9,285,649 B2 | 3/2016 | Du et al. | |
| 9,293,511 B2 | 3/2016 | Jacobson et al. | |
| 9,299,294 B2 | 3/2016 | Lin et al. | |
| 9,341,916 B2 | 5/2016 | Telfer et al. | |
| 9,360,733 B2 | 6/2016 | Wang et al. | |
| 9,361,836 B1 | 6/2016 | Telfer et al. | |
| 9,373,289 B2 | 6/2016 | Sprague et al. | |
| 9,383,623 B2 | 7/2016 | Lin et al. | |
| 9,390,066 B2 | 7/2016 | Smith et al. | |
| 9,390,661 B2 | 7/2016 | Chiu et al. | |
| 9,412,314 B2 | 8/2016 | Amundson et al. | |
| 9,423,666 B2 | 8/2016 | Wang et al. | |
| 9,459,510 B2 | 10/2016 | Lin | |
| 9,460,666 B2 | 10/2016 | Sprague et al. | |
| 9,495,918 B2 | 11/2016 | Harrington et al. | |
| 9,501,981 B2 | 11/2016 | Lin et al. | |
| 9,513,527 B2 | 12/2016 | Chan et al. | |
| 9,513,743 B2 | 12/2016 | Sjodin et al. | |
| 9,514,667 B2 | 12/2016 | Lin | |
| 9,541,814 B2 | 1/2017 | Lin et al. | |
| 9,542,895 B2 | 1/2017 | Gates et al. | |
| 9,564,088 B2 | 2/2017 | Wilcox et al. | |
| 9,612,502 B2 | 4/2017 | Danner et al. | |
| 9,620,048 B2 | 4/2017 | Sim et al. | |
| 9,620,067 B2 | 4/2017 | Harrington et al. | |
| 9,671,668 B2 | 6/2017 | Chan et al. | |
| 9,672,766 B2 | 6/2017 | Sjodin | |
| 9,691,333 B2 | 6/2017 | Cheng et al. | |
| 9,697,778 B2 | 7/2017 | Telfer et al. | |
| 9,721,495 B2 | 8/2017 | Harrington et al. | |
| 9,740,076 B2 | 8/2017 | Paolini et al. | |
| 9,759,980 B2 | 9/2017 | Du et al. | |
| 9,765,015 B2 | 9/2017 | Shao et al. | |
| 9,792,861 B2 | 10/2017 | Chang et al. | |
| 9,792,862 B2 | 10/2017 | Hung et al. | |
| 9,812,073 B2 | 11/2017 | Lin et al. | |
| 9,921,451 B2 | 3/2018 | Telfer et al. | |
| 9,961,744 B1 | 5/2018 | Doar et al. | |
| 9,965,999 B1* | 5/2018 | Barnes | G09G 3/3413 |
| 9,966,018 B2 | 5/2018 | Gates et al. | |
| 10,162,242 B2 | 12/2018 | Wang et al. | |
| 10,209,556 B2 | 2/2019 | Rosenfeld et al. | |
| 10,229,641 B2 | 3/2019 | Yang et al. | |
| 10,233,339 B2 | 3/2019 | Du et al. | |
| 10,276,109 B2 | 4/2019 | Crounse et al. | |
| 10,296,046 B2 | 5/2019 | Hunter et al. | |
| 10,319,313 B2 | 6/2019 | Harris et al. | |
| 10,339,876 B2 | 7/2019 | Lin et al. | |
| 10,353,266 B2 | 7/2019 | Bouchard et al. | |
| 10,444,553 B2 | 10/2019 | Laxton | |
| 10,467,984 B2 | 11/2019 | Buckley et al. | |
| 10,514,583 B2 | 12/2019 | Zhang | |
| 10,593,272 B2 | 3/2020 | Telfer et al. | |
| 10,672,350 B2 | 6/2020 | Amundson et al. | |
| 10,782,586 B2 | 9/2020 | Liu et al. | |
| 11,049,463 B2 | 6/2021 | Lin et al. | |
| 11,675,244 B2 | 6/2023 | Visani et al. | |
| 11,686,989 B2 | 6/2023 | Telfer et al. | |
| 11,735,124 B2 | 8/2023 | Park et al. | |
| 12,260,833 B2* | 3/2025 | Wyatt | G02B 5/208 |
| 2002/0024529 A1* | 2/2002 | Miller | G09G 5/10 |
| | | | 345/690 |
| 2003/0102858 A1 | 6/2003 | Jacobson et al. | |
| 2004/0246562 A1 | 12/2004 | Chung et al. | |
| 2005/0253777 A1 | 11/2005 | Zehner et al. | |
| 2007/0091418 A1 | 4/2007 | Danner et al. | |
| 2007/0103427 A1 | 5/2007 | Zhou et al. | |
| 2007/0176912 A1 | 8/2007 | Beames et al. | |
| 2008/0024429 A1 | 1/2008 | Zehner | |
| 2008/0024482 A1 | 1/2008 | Gates et al. | |
| 2008/0043318 A1 | 2/2008 | Whitesides et al. | |
| 2008/0048970 A1 | 2/2008 | Drzaic et al. | |
| 2008/0136774 A1 | 6/2008 | Harris et al. | |
| 2008/0303780 A1 | 12/2008 | Sprague et al. | |
| 2009/0174651 A1 | 7/2009 | Jacobson et al. | |
| 2009/0225398 A1 | 9/2009 | Duthaler et al. | |
| 2009/0322721 A1 | 12/2009 | Zehner et al. | |
| 2010/0053222 A1* | 3/2010 | Kerofsky | G09G 3/3406 |
| | | | 345/690 |
| 2010/0156780 A1 | 6/2010 | Jacobson et al. | |
| 2010/0194733 A1 | 8/2010 | Lin et al. | |
| 2010/0194789 A1 | 8/2010 | Lin et al. | |
| 2010/0220121 A1 | 9/2010 | Zehner et al. | |
| 2010/0265561 A1 | 10/2010 | Gates et al. | |
| 2011/0043543 A1 | 2/2011 | Chen et al. | |
| 2011/0063314 A1 | 3/2011 | Chiu et al. | |
| 2011/0193840 A1 | 8/2011 | Amundson et al. | |
| 2011/0193841 A1 | 8/2011 | Amundson et al. | |
| 2011/0199671 A1 | 8/2011 | Amundson et al. | |
| 2011/0221740 A1 | 9/2011 | Yang et al. | |
| 2012/0001957 A1 | 1/2012 | Liu et al. | |
| 2012/0098740 A1 | 4/2012 | Chiu et al. | |
| 2012/0169796 A1* | 7/2012 | Kobiki | G09G 3/3611 |
| | | | 345/690 |
| 2012/0326957 A1 | 12/2012 | Drzaic et al. | |
| 2013/0063333 A1 | 3/2013 | Arango et al. | |
| 2013/0100097 A1* | 4/2013 | Martin | G09G 3/20 |
| | | | 345/207 |
| 2013/0242378 A1 | 9/2013 | Paolini, Jr. et al. | |
| 2013/0249782 A1 | 9/2013 | Wu et al. | |
| 2013/0271437 A1* | 10/2013 | Webster | G09G 3/3466 |
| | | | 345/207 |
| 2013/0278995 A1 | 10/2013 | Drzaic et al. | |
| 2014/0009817 A1 | 1/2014 | Wilcox et al. | |
| 2014/0055840 A1 | 2/2014 | Zang et al. | |
| 2014/0063039 A1* | 3/2014 | Drzaic | G09G 5/02 |
| | | | 345/589 |
| 2014/0078576 A1 | 3/2014 | Sprague | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2014/0362213 A1 | 12/2014 | Tseng | |
| 2015/0005720 A1 | 1/2015 | Zang et al. | |
| 2015/0118390 A1 | 4/2015 | Rosenfeld et al. | |
| 2015/0262255 A1 | 9/2015 | Khajehnouri et al. | |
| 2015/0262551 A1 | 9/2015 | Zehner et al. | |
| 2015/0268531 A1 | 9/2015 | Wang et al. | |
| 2015/0301246 A1 | 10/2015 | Zang et al. | |
| 2016/0012710 A1 | 1/2016 | Lu et al. | |
| 2016/0048054 A1 | 2/2016 | Danner | |
| 2016/0139478 A1* | 5/2016 | Whitehead | G02F 1/13306 |
| | | | 359/222.1 |
| 2016/0140910 A1 | 5/2016 | Amundson | |
| 2016/0180777 A1 | 6/2016 | Lin et al. | |
| 2016/0313491 A1* | 10/2016 | Li | G09G 3/2003 |
| 2019/0146300 A1* | 5/2019 | Sadlik | G02F 1/133514 |
| | | | 359/296 |
| 2020/0201454 A1* | 6/2020 | Nguyen | G02F 1/1673 |
| 2020/0295222 A1* | 9/2020 | Telfer | G02F 1/1677 |
| 2022/0398987 A1* | 12/2022 | Wyatt | H01L 25/0753 |

(56) References Cited

U.S. PATENT DOCUMENTS

2024/0111185 A1    4/2024  Wang et al.
2024/0241421 A1*   7/2024  Marchewka ............ G09F 9/372

OTHER PUBLICATIONS

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

ELECTROPHORETIC DEVICE WITH AMBIENT LIGHT SENSOR AND ADAPTIVE WHITENESS RESTORING AND COLOR BALANCING FRONTLIGHT

CROSS REFERENCE TO RELATED APPLICATIONS

This application claims priority from U.S. Provisional Patent Application No. 63/523,487 filed on Jun. 27, 2023 entitled ELECTROPHORETIC DEVICE WITH AMBIENT LIGHT SENSOR AND ADAPTIVE WHITENESS RESTORING AND COLOR BALANCING FRONTLIGHT, which is hereby incorporated by reference herein in its entirety.

BACKGROUND

An electrophoretic display (EPD) changes color by modifying the position of a charged colored particle with respect to a light-transmissive viewing surface. Such EPDs are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the EPDs provide a book-like reading experience, use little power, and allow a user to carry a library of hundreds of books in a lightweight handheld device.

For many years, EPDs included only two types of charged color particles: black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white EPD only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, e.g., the text of a book.

More recently, a variety of color option have become commercially available for EPDs, including three-color displays (black, white, red; black white, yellow), four color displays (black, white, red, yellow), and color filter displays that rely on the black/white particles described above. EPDs with three or four reflective particles operate similar to the conventional black and white displays because the desired color particle is driven to the viewing surface. The driving schemes are far more complicated than only black and white, but in the end, the optical function of the particles is the same, reflecting incoming light back to the viewer in the correct color.

Advanced Color electronic Paper (ACeP™) also included four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of EPD allows for thousands of colors at each pixel, it is critical to carefully control the position of each of the (50 to 500 nanometer-sized) pigments within a working space of about 10 to 20 micrometers in thickness. Obviously, variations in the position of the particles will result in incorrect colors being displayed at a given pixel. Accordingly, exquisite voltage control is required for such a system. More details of this system are available in the following U.S. patents, all of which are incorporated by reference in their entireties: U.S. Pat. Nos. 9,361,836; 9,921,451; 10,276,109; 10,353,266; 10,467,984; and 10,593,272.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe EPDs in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states that are not strictly black and white, e.g., the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, e.g., at least four times, the minimum duration of the addressing pulse required to change the state of the display element. It is shown in U.S. Pat. No. 7,170,670 that some particle-based EPDs capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an EPD, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based EPDs have been the subject of intense research and development for a number of years. In such displays, a plurality of charged particles (sometimes referred to as pigment particles) move through a fluid under the influence of an electric field. EPDs can have attributes of good brightness and contrast, wide viewing angles, state bistability, and low power consumption when compared with liquid crystal displays. Nevertheless, problems with the long-term image quality of these displays have prevented their widespread usage. For example, particles that make up EPDs tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, e.g., Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, e.g., in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see, e.g., U.S. Pat. Nos. 7,002,728 and 7,679,814;
(b) Capsules, binders and encapsulation processes; see, e.g., U.S. Pat. Nos. 6,922,276 and 7,411,719;
(c) Microcell structures, wall materials, and methods of forming microcells; see, e.g., U.S. Pat. Nos. 7,072,095 and 9,279,906;
(d) Methods for filling and sealing microcells; see, e.g., U.S. Pat. Nos. 7,144,942 and 7,715,088;
(e) Films and sub-assemblies containing electro-optic materials; see, e.g., U.S. Pat. Nos. 6,982,178 and 7,839,564;
(f) Backplanes, adhesive layers and other auxiliary layers and methods used in displays; see, e.g., U.S. Pat. Nos. 7,116,318 and 7,535,624;
(g) Color formation color adjustment; see, e.g., U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;
(h) Methods for driving displays; see, e.g., U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);
(i) Applications of displays; see, e.g., U.S. Pat. Nos. 7,312,784 and 8,009,348; and
(j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed EPD, in which the electrophoretic medium comprises a plurality of discrete droplets of an electrophoretic fluid and a continuous phase of a polymeric material, and that the discrete droplets of electrophoretic fluid within such a polymer-dispersed EPD may be regarded as capsules or microcapsules even though no discrete capsule membrane is associated with each individual droplet; see, e.g., U.S. Pat. No. 6,866,760. Accordingly, for purposes of the present application, such polymer-dispersed electrophoretic media are regarded as sub-species of encapsulated electrophoretic media.

A related type of EPD is a so-called microcell EPD. In a microcell EPD, the charged particles and the fluid are not encapsulated within microcapsules, but instead are retained within a plurality of cavities formed within a carrier medium, typically a polymeric film. See, e.g., U.S. Pat. Nos. 6,672,921 and 6,788,449.

Although electrophoretic media are often opaque (since, e.g., in many electrophoretic media, the particles substantially block transmission of visible light through the display) and operate in a reflective mode, many EPDs can be made to operate in a so-called shutter mode in which one display state is substantially opaque and one is light-transmissive. See, e.g., U.S. Pat. Nos. 5,872,552; 6,130,774; 6,144,361; 6,172,798; 6,271,823; 6,225,971; and 6,184,856. Dielectrophoretic displays, which are similar to EPDs but rely upon variations in electric field strength, can operate in a similar mode. See U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated EPD typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above, most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array (CFA) may be deposited over the viewing surface of the monochrome (black and white) display. (By way of example, U.S. Pat. No. 6,862,128 discloses an EPD with a CFA as shown in FIG. 6 reproduced from that patent.) Displays with CFAs rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multi-color EPDs having a single back plane comprising independently addressable pixel electrodes and a common, light-transmissive front electrode. A plurality of electrophoretic layers are disposed between the back plane and the front electrode. Displays described in these patents are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (e.g., caused by light scattering or unwanted absorption) may affect the appearance of images formed in underlying electrophoretic layers.

Two other types of electrophoretic systems provide a single electrophoretic medium capable of rendering any color at any pixel location. Specifically, U.S. Pat. No. 9,697,778 describes a display in which a dyed solvent is combined with a white (light-scattering) particle that moves in a first direction when addressed with a low applied voltage and in the opposite direction when addressed with a higher voltage. When the white particles and the dyed solvent are combined with two additional particles of opposite charge to the white particle, it is possible to render a full-color display. However, the color states of the '778 patent are not acceptable for applications such as a text reader. In particular, there will always be some of the dyed fluid separating the white scattering particle from the viewing surface, which leads to a tint in the white state of the display.

A second form of electrophoretic medium capable of rendering any color at any pixel location is described in U.S. Pat. No. 9,921,451. In the '451 patent, the electrophoretic medium includes four particles: white, cyan, magenta and yellow, in which two of the particles are positively-charged and two negatively charged. However displays of the '451 patent also suffer from color mixing with the white state. Because one of the particles has the same charge as the white particle, some quantity of the same-charge particle moves with the white toward the viewing surface when the white state is desired. While it is possible to overcome this unwanted tinting with complex waveforms driving the display, such waveforms greatly increase the update time of the display and in some instances, result in unacceptable "flashing" between images.

Reflective displays like EPDs show information by modulating reflected light. A reflective display comprises at least two basic optical elements: a reflector (such as a mirror, retro-reflector, or diffuse white reflector) and a reflection modulator (e.g., a pigment particle). The reflector's optical characteristics determine the appearance of the "white" background. A subgroup of reflective displays have the appearance of paper and are thus described as "paper-like" or having a high degree of "paper similarity". To appear paper-like, the white state reflection should be as high as possible, spectrally uniform to appear neutral not colored, and diffuse with a near-Lambertian scatter characteristic, which makes its reflected luminance independent of the viewing direction. The modulator's spectral characteristics determine whether the reflected light appears achromatic or colored.

The optical characteristics of print on paper is a reasonable benchmark against which the paper similarity of reflective displays can be measured. Current industry specifications for print on paper include SNAP (Specifications for Newsprint Advertising Production) for newspaper ad inserts, and SWOP (Specifications for Web Offset Publications) for magazines and other high-quality printing. They specify the white (determined by the grade of paper), contrast, and colors for the print primaries (cyan/magenta/yellow (CMY)), overprints of two primaries (RGB), and black. The lightness of white paper (in 1976 CIELAB units) is 85L* for SNAP and 95L* for SWOP.

Current EPDs, especially color EPDs, do not reach the white reflection levels of paper. EPDs use electrically charged pigments. White pigments with near-Lambertian scatter characteristics make up the "paper" in ePaper, forming the opaque white background for image-forming pigments that absorb or spectrally modulate reflected light in the same way ink does on traditional paper. The two most viable ways of making color EPDs are displays using a CFA in front of an achromatic (black and white) backplane, or ACeP using four pigments: one scattering white pigment and three subtractive transparent color pigments such as cyan, magenta, and yellow.

Although the Lambertian reflection characteristics of the white pigment ensures the paper-like appearance and wide range of viewing directions of ePaper, there are fundamental limitations that reduce its lightness (CIE 1976 L*—CIE L*,a*,b* color space system) in direct comparison to printed paper. Unlike inked paper, which is dry and open towards the viewer, the pigments in an EPD are floating in liquid, contained in small compartments such as microcapsules or microcups. These compartments are topped, on the viewing side, by functional transparent optical layers such as adhesives, electrodes, a protective sheet, an integrated lighting unit (ILU), and a touch screen. EPD surface appearance can be glossy or matte. The surface, optical interfaces, and scatter within the stack of optical layers reflects a portion of incident ambient light before it ever reaches the pigments. Total internal reflection (TIR) traps a portion of light diffusely reflected by the pigments into directions beyond its critical angle. Inefficient in-coupling, reflection, and out-coupling reduce the total optical efficiency of ePaper, making it darker and less colorful in comparison to paper.

The CFA limits the white state lightness further in comparison with an achromatic B&W EPD or print on paper because unlike print or B&W EPDs where 'white' simply means 'no ink' or 'no black pigment,' the CFA is always present. In a CFA with triples of RGB subpixels having optimal filter characteristics with 100% filter transmission over the corresponding red, green, or blue third of the visible spectrum, the reflectance of white, with all three subpixels switched to a white state (WS), cannot exceed $(\frac{1}{3}+\frac{1}{3}+\frac{1}{3})/3=\frac{1}{3}$. This limits its white state lightness to a theoretical maximum of only 64L*. The lightness of CFA displays can be increased by reducing the CFA fill factor, by adding a fourth filter-less W subpixel, or by using filter primaries that transmit $\frac{2}{3}$ instead of $\frac{1}{3}$ of the visible spectrum, e.g., CMY. This increases lightness to a theoretical maximum of 76L*, but at the cost of reduced color saturation. The optical loss factors described above reduce the lightness of CFA displays to just above 50L*. In addition, variations in CFA deposit (printing) can lead to an undesirable color tint of the white state.

The optical loss factors described above apply also to ACeP displays. In contrast to CFA displays, ACeP displays can be described as "full color" because they do not require any sub-pixels; each pixel can be switched between a full-area white, full-area colors, and full-area black. Although the white pigment reflection alone could reach 75 to 80L*, optical losses from compartmentalization and functional optical layers reduce the white state further to less than 70L*. In addition, contamination of the white state with color pigments can lead to an undesirable color tint of white and a further reduction of its L* down to 63.

Thus, the lightness of color EPDs is generally limited to a range of about 50 to 70L*, which is considerably lower than print specifications (85 to 95L*).

Ambient illumination is required to view information displayed on an EPD. Ambient illumination comes from many sources, each with its own spectral, angular distribution and direction of incidence. In principle, each illumination environment is composed of light from directional sources (e.g., sun, light fixtures) and a hemispherical-diffuse background illumination (e.g., light scattered from blue or overcast sky outdoors, or from white walls and ceiling indoors). Although ambient lighting is outside the control of the display designer, it has a considerable influence on the perception of the displayed information. Contrast ratio (CR) and color gamut volume (GV) of an EPD will change with illumination geometry, being highest in pure directional, and lowest in pure hemispherical-diffuse illumination where the effects of surface reflection, TIR and scatter are at their highest. The spectral distribution of incident light changes the perception of displayed colors when viewing the display in daylight, incandescent light, or fluorescent light. For EPDs as well as print on paper, inadequate ambient light levels will affect the viewing of information. Very low levels of illuminance exaggerate the appearance of lower contrast (Stevens effect) or lower colorfulness (Hunt effect) of an EPD compared to a color print.

Frontlighting of an EPD, implemented as an ILU, is effective in controlling the EPD lighting and extending its use into low light environments where emissive displays were previously the only viable option. ILUs comprise a light guide sheet laminated to the front viewing side of the EPD. Light from edge-mounted light-emitting diodes (LEDs) is coupled into the light guide sheet where total internal reflection propagates it parallel to the EPD surface. A distribution of light-turning microstructures (scattering, reflecting, or refracting) directs light toward the reflecting electrophoretic layer. In most eReaders, the brightness (luminance) of their ILU is user-controlled, and can be varied freely over a wide range of white state luminance levels, typically between 50 cd/m$^2$ and 150 cd/m$^2$, sometimes as high as 300 cd/m$^2$.

Thus, using a frontlight has the potential to effectively compensate for the limited white state lightness (L*) of an EPD in ambient illumination compared to the lightness of the paper reference. However, ILUs with user-controlled brightness settings can be detrimental to the overall performance of the EPD. Users often tend to turn up its 'brightness' (specified as luminance in cd/m$^2$) to higher levels than actually needed for comfortable reading. Higher than necessary brightness levels will drain the EPD's battery, eliminating or reducing the power-saving advantage of EPDs compared to backlit LCDs. In addition, ILUs operated at high brightness increase the potentially adverse health effects of blue light exposure from the ILU's LED spectrum. Of the LED's blue emission peak, the radiation between 415 nm and 45 nm is potentially hazardous to retinal cells, but only if its exposure exceeds a dose limit of 0.5 J/cm$^2$. A need exists for an adaptive ILU that limits its brightness to that which is necessary for reading, thus preserving battery capacity and protecting the eye health of the user.

SUMMARY

Disclosed herein are improved electrophoretic devices with ambient light sensors and frontlight systems for adaptively restoring whiteness and balancing color on the display.

In a first aspect, the invention provides an electrophoretic display apparatus, comprising an electrophoretic device having a viewing surface, a drive system coupled to the electrophoretic device for driving the electrophoretic device among a plurality of optical states, and one or more ambient light sensors at the viewing surface of the electrophoretic device for detecting a level of ambient illuminance incident on the viewing surface. The apparatus also includes a frontlight unit disposed above the viewing surface of the electrophoretic device for illuminating the viewing surface. A frontlight control system is coupled to the one or more ambient light sensors and the frontlight unit, and is configured to: (a) receive, from the one or more ambient light sensors, one or more signals indicating a detected level of ambient illuminance incident on the viewing surface of the electrophoretic device; (b) compare the detected level of ambient illuminance to a predetermined threshold level; (c) when the detected level of ambient illuminance is less than or equal to the predetermined threshold level, control frontlight illuminance incident on the viewing surface from the frontlight unit to adaptively maintain a constant viewing surface luminance comprising light reflected by the viewing surface from the frontlight illuminance and the ambient illuminance, irrespective of the detected level of the ambient illuminance; (d) when the detected level of ambient illuminance is greater than the predetermined threshold level, control the frontlight illuminance incident on the viewing surface from the frontlight unit to maintain the viewing surface luminance at generally the same level as a white diffuse reflector under the same detected level of ambient illuminance, wherein the white diffuse reflector comprises a Lambertian reflective surface having a value of L*=100; and (e) repeat steps (a) through (d) a plurality of times.

In a second aspect, the invention provides an electrophoretic display apparatus, comprising an electrophoretic device having a viewing surface; a drive system coupled to the electrophoretic device for driving the electrophoretic device among a plurality of optical states; and one or more ambient light sensors at the viewing surface of the electrophoretic device including at least one trichromatic sensor for detecting ambient trichromatic irradiance in red, green, and blue color channels incident on the viewing surface. A frontlight unit is disposed above the viewing surface of the electrophoretic device for illuminating the viewing surface, including at least one trichromatic light source comprising independently controllable red, green, and blue color channels. A frontlight control system is coupled to the one or more ambient light sensors and the frontlight unit to control the chrominance of illumination from the at least one trichromatic light source to compensate for white states of the electrophoretic device that are off-white. The frontlight control system is configured to: (a) receive, from the one or more ambient light sensors, one or more signals indicating a detected level of ambient trichromatic irradiance in the red, green, and blue color channels incident on the viewing surface; (b) compare the detected level of ambient trichromatic irradiance to a predetermined threshold level in each of the red, green, and blue color channels; (c) when the detected level of ambient trichromatic irradiance is less than or equal to the predetermined threshold level in any of the red, green, and blue color channels, control frontlight illuminance incident on the viewing surface from the frontlight unit in that channel to adaptively maintain a constant level of trichromatic irradiance comprising the trichromatic irradiance reflected by the viewing surface from the frontlight illuminance and the ambient trichromatic irradiance, irrespective of the detected level of the ambient trichromatic irradiance; (d) when the detected level of ambient trichromatic irradiance is greater than the predetermined threshold level in any of the red, green, and blue color channels, control the frontlight illuminance incident on the viewing surface from the frontlight unit in that channel to maintain the viewing surface trichromatic irradiance at generally the same level as an ideal Lambertian reflector under the same detected level of ambient trichromatic irradiance; and (e) repeat steps (a) through (d) a plurality of times.

In a third aspect, the invention provides an electrophoretic display apparatus, comprising an electrophoretic device having a viewing surface, a drive system coupled to the electrophoretic device for driving the electrophoretic device among a plurality of optical states, and one or more ambient light sensors at the viewing surface of the electrophoretic device including at least one multispectral sensor with more than three spectral channels. A frontlight unit is disposed above the viewing surface of the electrophoretic device for illuminating the viewing surface, including at least one multispectral frontlight with more than three independently controlled spectral channels. A frontlight control system is coupled to the one or more ambient light sensors and the frontlight unit to control the spectral irradiance from the at least one at least one multispectral frontlight, the frontlight control system is configured to: (a) receive, from the one or more ambient light sensors, one or more signals indicating a detected level of ambient spectral irradiance in the spectral channels incident on the viewing surface; (b) compare the detected level of ambient spectral irradiance to a predetermined threshold level in each of the spectral channels; (c) when the detected level of ambient spectral irradiance is less than or equal to the predetermined threshold level in any of the spectral channels, control frontlight illuminance incident on the viewing surface from the frontlight unit in that channel to adaptively maintain a constant level of spectral irradiance comprising the spectral irradiance reflected by the viewing surface from the frontlight illuminance and the ambient spectral irradiance, irrespective of the detected level of the ambient spectral irradiance; (d) when the detected level of ambient spectral irradiance is greater than the predetermined threshold level in any of the spectral channels, control the frontlight illuminance incident on the viewing surface from the frontlight unit in that channel to maintain the viewing surface spectral irradiance at generally the same level as an ideal Lambertian reflector under the same detected level of ambient spectral irradiance; and (e) repeat steps (a) through (d) a plurality of times.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 13A is a graph showing the ambient spectral radiance of an EPD white state with the frontlight switched on. FIG. 13B shows the display colors in ambient D50 illumination without frontlighting. FIG. 13C shows the display colors with frontlighting. FIG. 13D is a graph showing the a*b* color gamut area in ambient D50 illumination with the frontlight switched off vs. on.

DETAILED DESCRIPTION

Various embodiments of the invention disclosed herein relate to improved electrophoretic devices with ambient light sensors and frontlight systems for adaptively restoring whiteness and balancing color on the display.

By way of background, U.S. Patent Application Publication No. 20220082896, the content of which is incorporated herein by reference in its entirety, discloses an exemplary electrophoretic medium, specifically a four-particle electrophoretic medium, including a first particle of a first polarity and three other particles having the opposite polarity and different magnitudes of charge. Typically, such a system includes a negative white particle and yellow, magenta, and cyan positively-charged particles having subtractive primary colors. Additionally, some particles may be engineered so that their electrophoretic mobility is non-linear with respect to the strength of the applied electric field. Accordingly, one or more particles will experience a decrease in electrophoretic mobility with the application of a high electric field (e.g., 20V or greater) of the correct polarity. Such a four-particle system is shown schematically in FIG. 1, and it can provide white, yellow, red, magenta, blue, cyan, green, and black at every pixel.

Figure 1:
FIG. 1 is a schematic cross-section showing the positions of the various colored particles in an electrophoretic medium when displaying black, white, the three subtractive primary colors, and the three additive primary colors.

As shown in FIG. 1, each of the eight principal colors (red, green, blue, cyan, magenta, yellow, black, and white) corresponds to a different arrangement of the four particles, such that the viewer only sees those colored particles that are on the viewing side of the white particle (i.e., the only particle that scatters light). To achieve a wide range of colors, additional voltage levels are used for finer control of the particles. In the formulations described, the first (typically negative) particle is reflective (typically white), while the other three particles oppositely charged (typically positive) particles include three substantially non-light-scattering ("SNLS"). The use of SNLS particles allows mixing of colors and provides for more color outcomes than can be achieved with the same number of scattering particles. These thresholds must be sufficiently separated for avoidance of cross-talk, and this separation necessitates the use of high addressing voltages for some colors. The four-particle electrophoretic media can also be updated faster, require "less flashy" transitions, and produce color spectra that is more pleasing to the viewer (and thus, commercially more valuable). Additionally, the disclosed formulations provides for fast (e.g., less than 500 ms, e.g., less than 300 ms, e.g., less than 200 ms, e.g., less than 100 ms) updates between black and white pixels, thereby enabling fast page turns for black on white text.

In FIG. 1, it is assumed that the viewing surface of the display is at the top (as illustrated), i.e., a user views the display from this direction, and light is incident from this direction. As already noted, only one of the four particles used in the electrophoretic medium substantially scatters light, and in FIG. 1 this particle is assumed to be the white pigment. This light-scattering white particle forms a white reflector against which any particles above the white particles (as illustrated in FIG. 1) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta, and yellow particles lie below the white particles (Situation [A] in FIG. 1), there are no particles above the white particles and the pixel simply displays a white color. When a single particle is above the white particles, the color of that single particle is displayed, yellow, magenta and cyan in Situations [B], [D], and [F], respectively in FIG. 1. When two particles lie above the white particles, the color displayed is a combination of those of these two particles; in FIG. 1, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 1), all the incoming light is absorbed by the three subtractive primary colored particles and the pixel displays a black color.

It is possible that one subtractive primary color could be rendered by a particle that scatters light, so that the display would comprise two types of light-scattering particles, one of which would be white and the other colored. In this case, however, the position of the light-scattering colored particle with respect to the other colored particles overlying the white particle would be important. For example, in rendering the color black (when all three colored particles lie over the white particles), the scattering colored particle cannot lie over the non-scattering colored particles (otherwise they will be partially or completely hidden behind the scattering particle and the color rendered will be that of the scattering colored particle, not black).

FIG. 1 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. Such color contamination should be minimized to the point that the colors formed are commensurate with an industry standard for color rendition. A particularly favored standard is SNAP (the standard for newspaper advertising production), which specifies $L^*$, $a^*$, and $b^*$ values for each of the eight primary colors referred to above. (Hereinafter, "primary colors" will be used to refer to the eight colors: black, white, the three subtractive primaries, and the three additive primaries as shown in FIG. 1.)

FIGS. 2A-2E, which are also disclosed in U.S. Patent Application Publication No. 20220082896, show schematic cross-sectional representations of the four particle types. A display layer utilizing the improved electrophoretic medium includes a first (viewing) surface 13 on the viewing side, and a second surface 14 on the opposite side of the first surface 13. The electrophoretic medium is disposed between the two surfaces. Each space between two dotted vertical lines denotes a pixel. Within each pixel, the electrophoretic medium can be addressed and the viewing surface 13 of each pixel can achieve the color states shown in FIG. 1 without a need for additional layers, and without a color filter array.

As standard with EPDs, the first surface 13 includes a common electrode 11, which is light-transmissive, e.g., constructed from a sheet of PET with indium tin oxide (ITO) disposed thereon. On the second surface 14, there is an electrode layer 12, which includes a plurality of pixel electrodes 15. Such pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, other types of electrode addressing can also be used as long as the electrodes serve the desired functions. For example, the top and bottom electrodes can be contiguous or segmented. Additionally, pixel electrode backplanes different from those described in the '228 patent are also suitable, and may include active matrix backplanes capable of providing higher driving voltages than typically found with amorphous silicon thin-film-transistor backplanes.

Newly-developed active matrix backplanes include thin film transistors incorporating metal oxide materials, such as tungsten oxide, tin oxide, indium oxide, zinc oxide or more complex metal oxides such as indium gallium zirconium oxide. In these applications, a channel formation region is formed for each transistor using such metal oxide materials, allowing faster switching of higher voltages. Such metal oxide transistors also allow for less leakage in the "off" state of the thin-film transistor (TFT) than can be achieved by, e.g., amorphous silicon TFTs. In a typical scanning TFT backplane comprising n lines, the transistor will be in the "off" state for approximately a proportion (n−1)/n of the time required to refresh every line of the display. Any leakage of charge from the storage capacitors associated with each pixel would result in degradation of the electro-optical performance of the display. TFTs typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE. Such backplanes are able to provide driving voltages of ±30V (or more). Intermediate voltage drivers can be included so that the resulting driving waveforms may include five levels, or seven levels, or nine levels, or more.

One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver. This enables use of a source driver (a switch in the EPD that determines which voltage is applied to each of the column electrodes for a given selected row of the display) capable of supplying at least five, and perhaps seven driving voltage levels. In one example, there are two positive voltages, two negative voltages, and zero volts. In another example, there are three positive voltages, three negative voltages, and zero volts. In another example, there are four positive voltages, four negative voltages, and zero volts. These levels may be chosen within the range of about −27V to +27V, without the limitations imposed by top plane switching as described above.

Figure 2A:
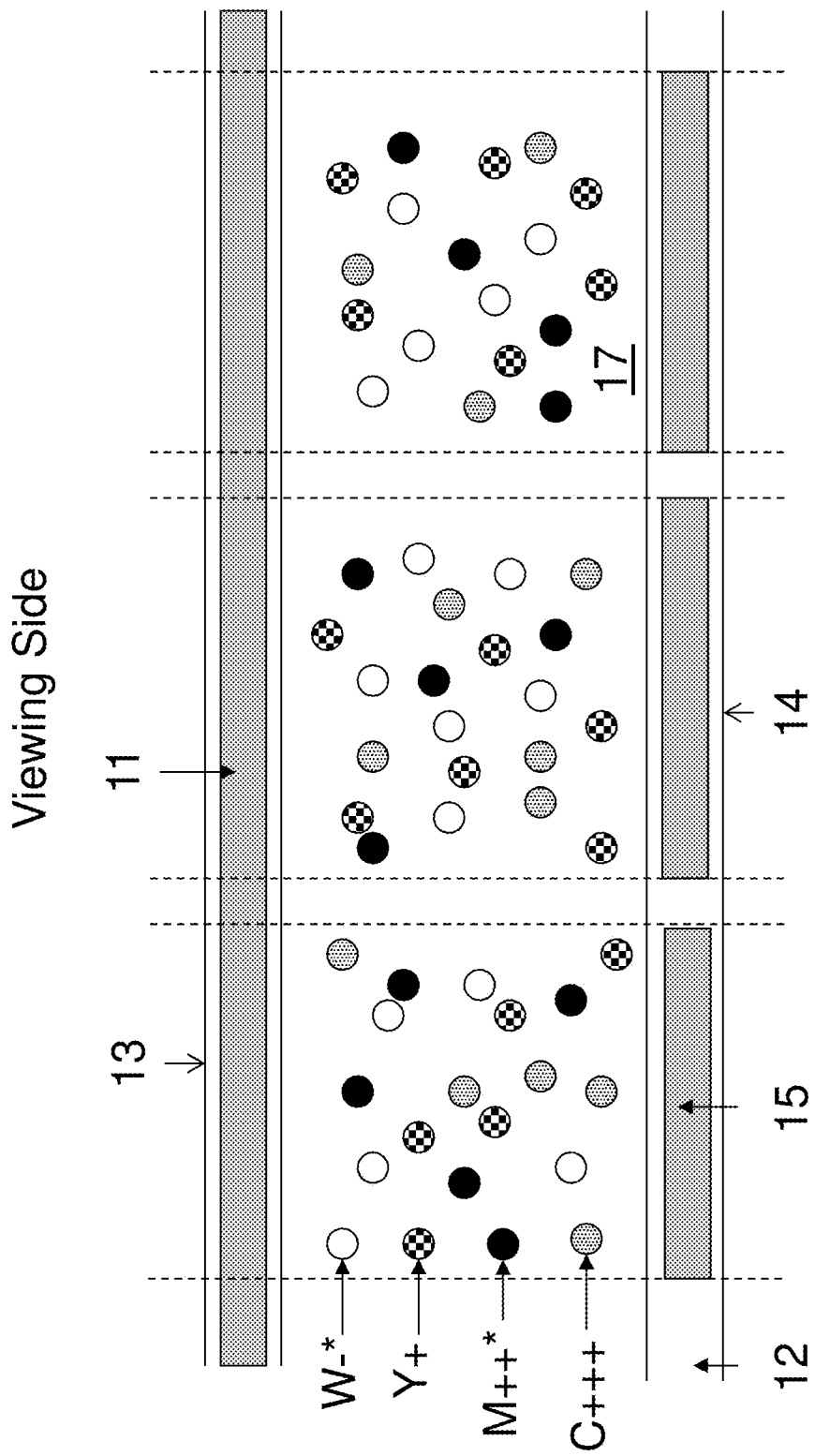
FIG. 2A is a simplified illustration of an exemplary EPD having four types of particles (white, yellow, magenta, and cyan) in a non-polar fluid capable of rendering a full range of colors at each pixel electrode.

The electrophoretic medium shown in FIGS. 2A-2E includes four types of electrophoretic particles in a non-polar fluid 17. A first particle (W−*; open circle) is negatively charged and may be surface treated so that the electrophoretic mobility of the first particle is dependent upon the strength of the driving electric field (discussed in greater detail below). In such instances, the electrophoretic mobility of the particle actually decreases in the presence of a stronger electric field, which is somewhat counter-intuitive. A second particle (M++*; dark circle) is positively charged, and may also be surface treated (or purposely untreated) so that either the electrophoretic mobility of the second particle is dependent upon the strength of the driving electric field, or the rate of unpacking of a collection of the second particle, after having been driven to one side of the cavity containing the particles upon reversal of the electric field direction, is slower than the rate of unpacking of collections of the third and fourth particles, or the particle forms a Coulombic aggregate with the first particle (W− in this case) that is separable by a high applied electric field, but not by a low applied electric field. A third particle (Y+; checkered circle) is positive, but has a charge magnitude that is smaller than the second particle. Additionally, the third particle may be surface treated, but not in a way that causes the electrophoretic mobility of the third particle to depend upon the strength of the driving electric field. That is, the third particle may have a surface treatment, however such a surface treatment does not result in the aforementioned reduction in electrophoretic mobility with an increased electric field. The fourth particle (C+++; gray circle) has the highest magnitude positive charge and the same type of surface treatment as the third particle. As indicated in FIG. 2A, the particles are nominally white, magenta, yellow, and cyan in color to produce colors as shown in FIG. 1. However, the system is not limited to this specific color set, nor is it limited to one reflective particle and three absorptive particles. For example, the system could include one black absorptive particle and three reflective particles of red, yellow, and blue with suitably matched reflectance spectra to produce a process white state when all three reflective particles are mixed and viewable at the surface.

The first particle (negative) is white and scattering. The second particle (positive, medium charge magnitude) is magenta and absorptive. The third particle (positive, low charge magnitude) is yellow and absorptive. The fourth particle (positive, high charge magnitude) is cyan and absorptive. Table 1 below shows the diffuse reflectance of exemplary yellow, magenta, cyan and white particles useful in electrophoretic media of the present invention, together with the ratio of their absorption and scattering coefficients according to the Kubelka-Munk analysis of these materials as dispersed in a poly(isobutylene) matrix.

TABLE 1

Diffuse reflectance of preferred yellow, magenta, cyan, and white particles.

| Color | Volume Fraction | Diffuse reflectance of 1 µm layer on 0% black | | | Ratio absorption/scatter | | |
|---|---|---|---|---|---|---|---|
| | | 450 nm | 550 nm | 650 nm | K/S 450 nm | K/S 550 nm | K/S 650 nm |
| Yellow (Y1) | 0.097 | 4.5% | 0.9% | 0.5% | 9.67 | 0.38 | 0.63 |
| Yellow (Y1) | 0.147 | 4.4% | 0.9% | 0.4% | 9.84 | 0.25 | 0.02 |
| Magenta (M1) | 0.115 | 2.8% | 3.8% | 0.7% | 10.01 | 10.85 | 1.27 |
| Magenta (M1) | 0.158 | 3.2% | 4.1% | 1.0% | 10.00 | 10.75 | 1.64 |
| Magenta (M1) | 0.190 | 3.4% | 4.1% | 1.3% | 10.09 | 10.80 | 1.03 |
| Cyan (C1) | 0.112 | 1.3% | 3.7% | 4.3% | 7.27 | 11.17 | 10.22 |
| Cyan (C1) | 0.157 | 1.5% | 3.8% | 4.3% | 7.41 | 11.30 | 10.37 |
| Cyan (C1) | 0.202 | 1.7% | 3.9% | 4.3% | 7.21 | 11.56 | 10.47 |
| White (W1) | 0.147 | 8.1% | 6.2% | 4.8% | 0.0015 | 0.0020 | 0.0026 |

TABLE 1-continued

Diffuse reflectance of preferred yellow, magenta, cyan, and white particles.

| Color | Volume Fraction | Diffuse reflectance of 1 μm layer on 0% black | | | Ratio absorption/scatter | | |
|---|---|---|---|---|---|---|---|
| | | 450 nm | 550 nm | 650 nm | K/S 450 nm | K/S 550 nm | K/S 650 nm |
| White (W1) | 0.279 | 24.9% | 20.6% | 17.0% | 0.0003 | 0.0003 | 0.0004 |
| White (W1) | 0.339 | 26.3% | 21.7% | 18.1% | 0.0001 | 0.0002 | 0.0002 |

The electrophoretic medium may be in any of the forms discussed above. Thus, the electrophoretic medium may be unencapsulated, encapsulated in discrete capsules surrounded by capsule walls, encapsulated in sealed microcells, or in the form of a polymer-dispersed medium. The pigments are described in further detail elsewhere, such as in U.S. Pat. Nos. 9,697,778 and 9,921,451. Briefly, white particle W1 is a silanol-functionalized light-scattering pigment (titanium dioxide) to which a polymeric material comprising lauryl methacrylate (LMA) monomers has been attached as described in U.S. Pat. No. 7,002,728. White particle W2 is a polymer-coated titania produced substantially as described in Example 1 of U.S. Pat. No. 5,852,196, with a polymer coating comprising an approximately 99:1 ratio of lauryl methacrylate and 2,2,2-trifluoroethyl methacrylate. Yellow particle Y1 is C.I. Pigment Yellow 180, used without coating and dispersed by attrition in the presence of Solsperse 19000, as described generally in U.S. Pat. No. 9,697,778. Yellow particle Y2 is C.I. Pigment Yellow 155 used without coating and dispersed by attrition in the presence of Solsperse 19000, as described generally in in U.S. Pat. No. 9,697,778. Yellow particle Y3 is C.I. Pigment Yellow 139, used without coating and dispersed by attrition in the presence of Solsperse 19000, as described generally in in U.S. Pat. No. 9,697,778. Yellow particle Y4 is C.I. Pigment Yellow 139, which is coated by dispersion polymerization, incorporating trifluoroethyl methacrylate, methyl methacrylate and dimethylsiloxane-containing monomers as described in Example 4 of U.S. Pat. No. 9,921,451. Magenta particle M1 is a positively-charged magenta material (dimethylquinacridone, C.I. Pigment Red 122) coated using vinylbenzyl chloride and LMA as described in U.S. Pat. No. 9,697,778 and in Example 5 of U.S. Pat. No. 9,921,451.

Magenta particle M2 is a C.I. Pigment Red 122, which is coated by dispersion polymerization, methyl methacrylate and dimethylsiloxane-containing monomers as described in Example 6 of U.S. Pat. No. 9,921,451. Cyan particle C1 is a copper phthalocyanine material (C.I. Pigment Blue 15:3) which is coated by dispersion polymerization, incorporating methyl methacrylate and dimethylsiloxane-containing monomers as described in Example 7 of U.S. Pat. No. 9,921,451. In some embodiments, it has been found that the color gamut is improved by using Ink Jet Yellow 4GC (Clariant) as the core yellow pigment, with incorporation of methyl methacrylate surface polymers. The zeta potential of this yellow pigment can be tuned with the addition of 2,2,2-trifluoroehtyl methacrylate (TFEM) monomers and monomethacrylate terminated poly(dimethylsiloxane).

Electrophoretic media additives and surface treatments for facilitating differential electrophoretic mobility, as well as proposed mechanisms for interaction between the surface treatment and surrounding charge control agents and/or free polymers, are discussed in detail in U.S. Pat. No. 9,697,778, incorporated by reference in its entirety. In such electrophoretic media, one way of controlling the interactions among the various types of particles is by controlling the kind, amount, and thickness of polymeric coatings on the particles. For example, to control the particle characteristics such that the particle-particle interactions are less between the second type of particles and the third and fourth types of particles than between, e.g., the third type of particles and the fourth type of particles of the third species, the second type of particle may bear a polymeric surface treatment, while the third and fourth types of particles bear either no polymeric surface treatment or a polymeric surface treatment having a lower mass coverage per unit area of the particle surface than the second type of particles. More generally, the Hamaker constant (which is a measure of the strength of the Van der Waals interaction between two particles, the pair potential being proportional to the Hamaker constant and inversely proportional to the sixth power of the distance between the two particles) and/or the interparticle spacing need(s) to be adjusted by judicious choice of the polymeric coating(s) on the three species of particles.

As discussed in U.S. Pat. No. 9,921,451, different types of polymers may include different types of polymer surface treatment. For example, Coulombic interactions may be weakened when the closest distance of approach of oppositely-charged particles is maximized by a steric barrier (typically a polymer grafted or adsorbed to the surface of one or both particles). The polymer shell may be a covalently-bonded polymer made by grafting processes or chemisorption as is well known in the art, or may be physisorbed onto the particle surface. For example, the polymer may be a block copolymer comprising insoluble and soluble segments. Alternatively, the polymer shell may be dynamic in that it is a loose network of free polymer from the electrophoretic medium that is complexed with a pigment particle in the presence of an electric field and a sufficient amount and kind of charge control agent (CCA—discussed below). Thus, depending upon the strength and polarity of the electric field, a particle may have more associated polymer, which causes the particle to interact differently with the container (e.g., microcapsule or microcell) and the other particles. The extent of the polymer shell is conveniently assessed by thermal gravimetric analysis (TGA), a technique in which the temperature of a dried sample of the particles is raised and the mass loss due to pyrolysis is measured as a function of temperature. Using TGA, the proportion of the mass of the particle that is polymer can be measured, and this can be converted to a volume fraction using the known densities of the core pigments and the polymers attached to them. Conditions can be found in which the polymer coating is lost but the core pigment remains (these conditions depend upon the precise core pigment particle used). A variety of polymer combinations can be made to work as described below with respect to FIGS. 2A-2E. For example, in some embodiments a particle (typically the first and/or second particle) can have a covalently-attached polymer shell that interacts strongly with the container (e.g., microcell or microcapsule). Meanwhile the other particles of the same charge have no polymer coating or complex with free polymers in the solution so that those particles have little interaction with the container. In other embodiments, a particle (typically the first and/or second particle) will have no surface coating so that it is easier for that particle to form a charge double layer and experience electrophoretic mobility reduction in the presence of strong fields.

The fluid 17, in which the four types of particles are dispersed, is clear and colorless. The fluid contains the charged electrophoretic particles, which move through the fluid under the influence of an electric field. A preferred suspending fluid has a low dielectric constant (about 2), high volume resistivity (about $10^{15}$ Ohm-cm), low viscosity (less than 5 mPas), low toxicity and environmental impact, low water solubility (less than 10 parts per million (ppm), if traditional aqueous methods of encapsulation are to be used; note however that this requirement may be relaxed for non-encapsulated or certain microcell displays), a high boiling point (greater than about 90° C.), and a low refractive index (less than 1.5). The last requirement arises from the use of scattering (typically white) pigments of high refractive index, whose scattering efficiency depends upon a mismatch in refractive index between the particles and the fluid.

Organic solvents such as saturated linear or branched hydrocarbons, silicone oils, halogenated organic solvents, and low molecular weight halogen-containing polymers are some useful fluids. The fluid may comprise a single component or may be a blend of more than one component in order to tune its chemical and physical properties. Reactants or solvents for the microencapsulation process (if used), such as oil soluble monomers, can also be contained in the fluid.

The fluid preferably has a low viscosity and a dielectric constant in the range of about 2 to about 30, preferably about 2 to about 15 for high particle mobility. Examples of suitable dielectric fluids include hydrocarbons such as Isopar®, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoro-ethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

The electrophoretic media typically also include one or more charge control agents (CCA), and may also include a charge director. CCA and charge directors typically comprise low molecular weight surfactants, polymeric agents, or blends of one or more components and serve to stabilize or otherwise modify the sign and/or magnitude of the charge on the electrophoretic particles. The CCA is typically a molecule comprising ionic or other polar groupings, hereinafter referred to as head groups. At least one of the positive or negative ionic head groups is preferably attached to a non-polar chain (typically a hydrocarbon chain) that is hereinafter referred to as a tail group. It is thought that the CCA forms reverse micelles in the internal phase and that it is a small population of charged reverse micelles that leads to electrical conductivity in the very non-polar fluids typically used as electrophoretic fluids.

The addition of CCAs provides for the production of reverse micelles including a highly polar core that may vary in size from 1 nm to tens of nanometers (and may have spherical, cylindrical, or other geometry) surrounded by the non-polar tail groups of the CCA molecule. In electrophoretic media, three phases may typically be distinguished: a solid particle having a surface, a highly polar phase that is distributed in the form of extremely small droplets (reverse micelles), and a continuous phase that comprises the fluid. Both the charged particles and the charged reverse micelles may move through the fluid upon application of an electric field, and thus there are two parallel pathways for electrical conduction through the fluid (which typically has a vanishingly small electrical conductivity itself).

The polar core of the CCA is thought to affect the charge on surfaces by adsorption onto the surfaces. In an EPD, such adsorption may be onto the surfaces of the electrophoretic particles or the interior walls of a microcapsule (or other solid phase, such as the walls of a microcell) to form structures similar to reverse micelles, these structures hereinafter being referred to as hemi-micelles. When one ion of an ion pair is attached more strongly to the surface than the other (e.g., by covalent bonding), ion exchange between hemi-micelles and unbound reverse micelles can lead to charge separation in which the more strongly bound ion remains associated with the particle and the less strongly bound ion becomes incorporated into the core of a free reverse micelle.

It is also possible that the ionic materials forming the head group of the CCA may induce ion-pair formation at the particle (or other) surface. Thus the CCA may perform two basic functions: charge-generation at the surface and charge-separation from the surface. The charge-generation may result from an acid-base or an ion-exchange reaction between some moiety present in the CCA molecule or otherwise incorporated into the reverse micelle core or fluid, and the particle surface. Thus, useful CCA materials are those which are capable of participating in such a reaction, or any other charging reaction as known in the art.

Non-limiting classes of charge control agents that are useful in electrophoretic media include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, cobalt, calcium, copper, manganese, magnesium, nickel, zinc, aluminum and iron salts of carboxylic acids such as naphthenic, octanoic, oleic, palmitic, stearic, and myristic acids and the like. Useful block or comb copolymers include, but are not limited to, AB diblock copolymers of (A) polymers of 2-(N,N-dimethylamino)

ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly (methyl methacrylate-methacrylic acid). Useful organic amides/amines include, but are not limited to, polyisobutylene succinimides such as OLOA 371 or 1200 (available from Chevron Oronite Company LLC, Houston, Tex.), or SOLSPERSE 17000 or 19000 (available from Lubrizol, Wickliffe, OH: Solsperse is a Registered Trade Mark), and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents. Useful tail groups for CCA include polymers of olefins such as poly(isobutylene) of molecular weight in the range of 200-10,000. The head groups may be sulfonic, phosphoric or carboxylic acids or amides, or alternatively amino groups such as primary, secondary, tertiary or quaternary ammonium groups. One class of CCAs that are useful in the disclosed four-particle electrophoretic media are disclosed in U.S. Patent Publication No. 2017/0097556, incorporated by reference herein in its entirety. Such CCAs typically include a quaternary amine head group and an unsaturated polymeric tail, i.e., including at least one C—C double bond. The polymeric tail is typically a fatty acid tail. A variety of CCA molecular weights can be used. In some embodiments, the molecular weight of the CCA is 12,000 grams/mole or greater, e.g., between 14,000 grams/mole and 22,000 grams/mole.

Charge adjuvants used in the media may bias the charge on electrophoretic particle surfaces, as described in more detail below. Such charge adjuvants may be Bronsted or Lewis acids or bases. Exemplary charge adjuvants are disclosed in U.S. Pat. Nos. 9,765,015, 10,233,339 and 10,782,586, all of which are incorporated by reference in their entireties. Exemplary adjuvants may include polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine. In some embodiments, the charge adjuvant is present in the EPD medium in an amount of between about 1 to about 500 milligrams per gram ("mg/g") of the particle mass, and more preferably between about 50 to about 200 mg/g.

Particle dispersion stabilizers may be added to prevent particle flocculation or attachment to the capsule or other walls or surfaces. For the typical high resistivity liquids used as fluids in EPDs, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

As described in U.S. Pat. No. 7,170,670, the bistability of electrophoretic media can be improved by including in the fluid a polymer having a number average molecular weight in excess of about 20,000, this polymer being essentially non-absorbing on the electrophoretic particles; poly(isobutylene) is a preferred polymer for this purpose. Also, as described in e.g., U.S. Pat. No. 6,693,620, a particle with immobilized charge on its surface sets up an electrical double layer of opposite charge in a surrounding fluid. Ionic head groups of the CCA may be ion-paired with charged groups on the electrophoretic particle surface, forming a layer of immobilized or partially immobilized charged species. Outside this layer is a diffuse layer comprising charged (reverse) micelles comprising CCA molecules in the fluid. In conventional DC electrophoresis an applied electric field exerts a force on the fixed surface charges and an opposite force on the mobile counter-charges, such that slippage occurs within the diffuse layer and the particle moves relative to the fluid. The electric potential at the slip plane is known as the zeta potential.

As a result, some of the particle types within the electrophoretic medium have different electrophoretic mobilities depending upon the strength of the electric field across the electrophoretic medium. For example, when a first (low strength, i.e., around ±10V or less) electric field is applied to the electrophoretic medium, the first type of particles move in one direction relative to the electric field, however, when a second (high strength, i.e., around ±20V or more) electric field is applied, having the same polarity as the first electric field, the first type of particles begins to move in the opposite direction relative to the electric field. It is theorized that the behavior results from conduction within the highly non-polar fluid being mediated by charged reverse micelles or counter-charged electrophoretic particles. Accordingly, any electrochemically-generated protons (or other ions) are probably transported through the non-polar fluid in micelle cores or adsorbed on electrophoretic particles. For example, as illustrated in FIG. 5B of U.S. Pat. No. 9,697,778, a positively-charged reverse micelle may approach a negative electrophoretic particle traveling in the opposite direction, wherein the reverse micelle is incorporated into the electric double layer around the negatively charged particle. (The electric double layer includes both the diffuse layer of charge with enhanced counter-ion concentration and the hemi-micellar surface-adsorbed coating on the particle; in the latter case, the reverse micelle charge would become associated with the particle within the slip envelope that, as noted above, defines the zeta potential of the particle.) Through this mechanism, an electrochemical current of positively-charged ions flows through the electrophoretic fluid, and the negatively-charged particles may become biased towards a more positive charge. As a result, the electrophoretic mobility, e.g., of the first negative type of particle is a function of the magnitude of the electrochemical current and the residence time of a positive charge close to the particle surface, which is a function of the strength of the electric field.

Furthermore, as also described in U.S. Pat. No. 9,697,778, positively-charged particles can be prepared that also exhibit different electrophoretic mobilities depending upon the applied electric field. In some embodiments, a secondary (or co-) CCA can be added to the electrophoretic medium to adjust the zeta potentials of the various particles. Careful selection of the co-CCA may allow alteration of the zeta potential of one particle while leaving those of the other particles essentially unchanged, allows close control of both the electrophoretic velocities of the various particles during switching and the inter-particle interactions.

In some embodiments, a portion of the charge control agents intended for the final formulation are added during synthesis of the electrophoretic particles to engineer the desired zeta potential and to influence the reduction in electrophoretic mobility due to a strong electric field. For example, it has been observed that adding quaternary amine charge control agents during polymer grafting will result in some amount of the CCA being complexed to the particles. (This can be confirmed by removing the particles from the electrophoretic fluid and subsequently stripping the surface species from the pigments with THE to remove all adsorbed species. When the THF extract is evaluated with 1H NMR, it is clear that a good amount of the CCA was adsorbed to the pigment particles or complexed with the surface polymer.) Experiments suggest that high CCA loading amongst the surface polymers of the particles facilitates the formation of a charge double layer around the particle in the presence of a strong electric field. For example, magenta particles having greater than 200 mg of a charge control agent (CCA) per gram of finished magenta particle have excellent staying properties in the presence of a high positive electric field. (See, e.g., FIG. 2C, and the description above.) In some embodiments, the CCA includes a quaternary amine head group and a fatty acid tail. In some embodiments the fatty acid tail is unsaturated. When some of the particles in the electrophoretic medium include high CCA loading, it is important that the particles for which consistent electrophoretic mobility is desired do not have substantial CCA loading, e.g., less than 50 mg of a charge control agent (CCA) per gram of finished particle, e.g., less than 10 mg of a charge control agent (CCA) per gram of finished particle.

Alternately, an electrophoretic medium including four types of particles in the presence of Solsperse 17000 in Isopar E benefits from the additions of small amounts of acidic entities, such as, e.g., aluminum salts of di-t-butyl salicylic acid (Bontron E-88, available from Orient Corporation, Kenilworth, NJ)). Addition of the acidic material moves the zeta potential of many particles (though not all) to more positive values. In one case, about 1% of the acidic material and 99% of Solsperse 17000 (based on total weight of the two materials) moves the zeta potential of the third type of particle (Y+) from −5 mV to about +20 mV. Whether or not the zeta potential of a particular particle is changed by a Lewis acidic material like the aluminum salt will depend upon the details of the surface chemistry of the particle.

Table 2 shows exemplary relative zeta potentials of the three types of colored and singular white particles in a preferred embodiment.

TABLE 2

Relative zeta potentials of colored particles in the presence of relative zeta potential of white particles.

| | White zeta potential (mV) | | | |
| --- | --- | --- | --- | --- |
| | −30 | 0 | 10 | 20 |
| Cyan zeta potential (mV) | 80 | 110 | 80 | 70 | 60 |
| Magenta zeta potential (mV) | 40 | 70 | 40 | 30 | 20 |
| +Yellow zeta potential (mV) | 20 | 50 | 20 | 10 | 0 |
| −Yellow zeta potential (mV) | −20 | 10 | −20 | −30 | −40 |

The negative (white) particle has a zeta potential of −30 mV, and the remaining three particles are all positive relative to the white particle. Accordingly, a display comprising positive cyan, magenta, and yellow particles can switch between a black state (with all colored particles in front of the white particle with respect to the viewing surface) and a white state, with the white particle closest to the viewer, and blocking the viewer from perceiving the remaining three particles. In contrast, when the white particle has a zeta potential of 0V, the negatively-charged yellow particle is the most negative of all the particles, and thus a display comprising this particle would switch between a yellow and a blue state. This would also occur if the white particle were positively charged. The positively-charged yellow particle, however, would be more positive than the white particle unless its zeta potential exceeded +20 mV.

The behavior of the electrophoretic media is consistent with the mobility of the white particle (represented in Table 2 as the zeta potential) being dependent upon the applied electric field. Thus, in the example illustrated in Table 2, when addressed with a low voltage the white particle might behave as though its zeta potential were −30 mV, but when addressed with a higher voltage it might behave as though its zeta potential were more positive, maybe even as high as +20 mV (matching the zeta potential of the yellow particle). Thus, when addressed with a low voltage, the display would switch between black and white states, but when addressed at a higher voltage would switch between blue and yellow states.

It is also possible that particles of opposite charge may form Coulombic aggregates. In the aggregated form the mobility of the particles may be different from what would be measured for the components of the aggregate. Thus, for example, an aggregate may be formed between the negatively-charged white particles and any of the oppositely-charge pigments. In certain embodiments it may be preferred that the electric field required to separate Coulombic aggregates be higher for some pigment pairs than for others. In the present case it is likely that the electric field required to separate an aggregate formed between the magenta and white pigments is larger than that required to separate aggregates formed between the cyan and white or yellow and white particles.

It is possible that the charges of the various pigment particles are affected by the presence of other charged pigments in their environment. Thus, it is not necessarily true that the charges (or zeta potentials) of the pigments in their final formulations are the same as those measured for the pigments on their own as dispersed in a solvent in the presence of a CCA.

Figure 2B:
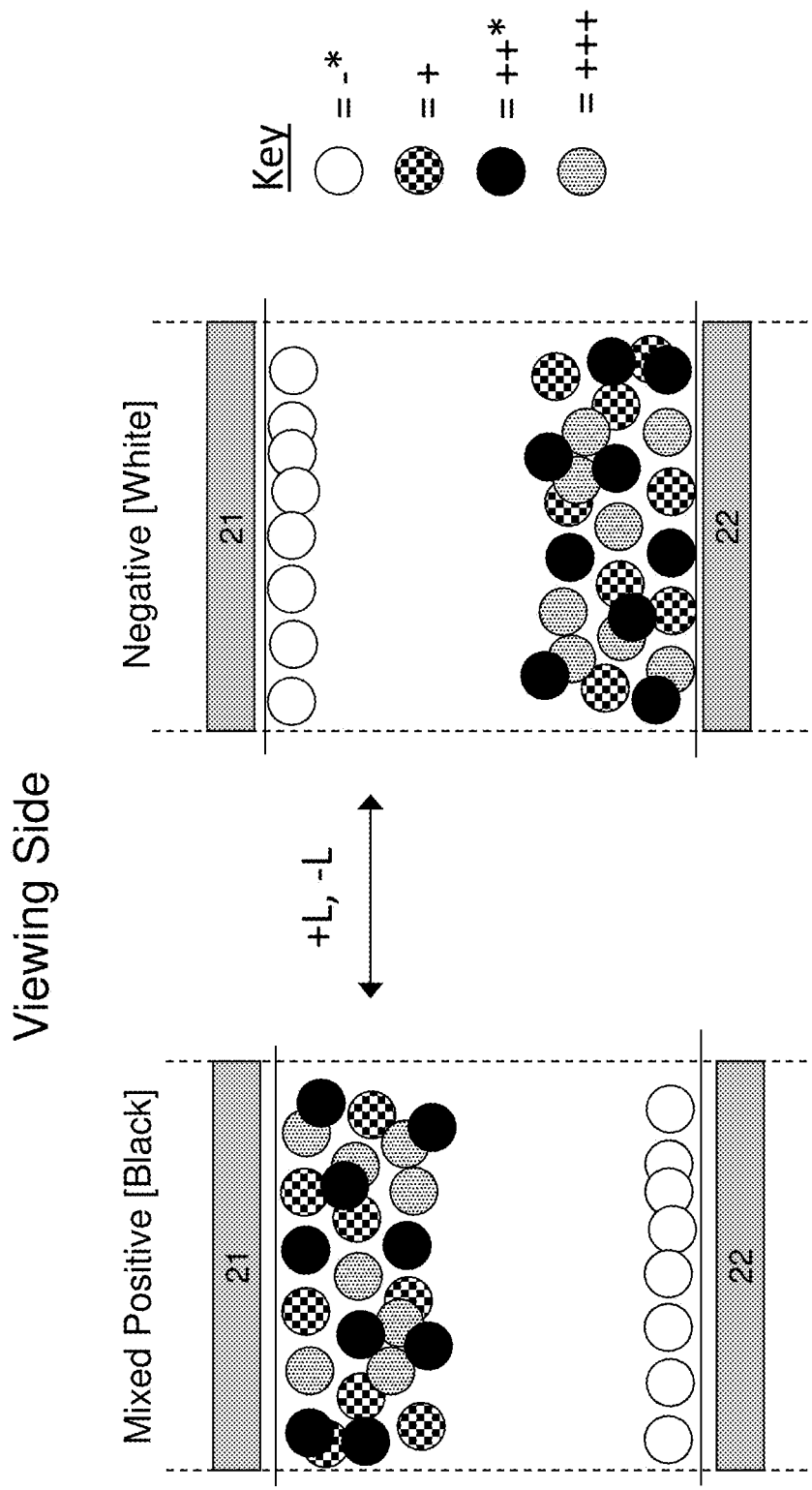
FIG. 2B illustrates a transition between a first optical state having all of the particles of a first charge polarity at the viewing surface and a second optical state having the particles with the second (opposite) polarity at the viewing surface.
Figure 2C:
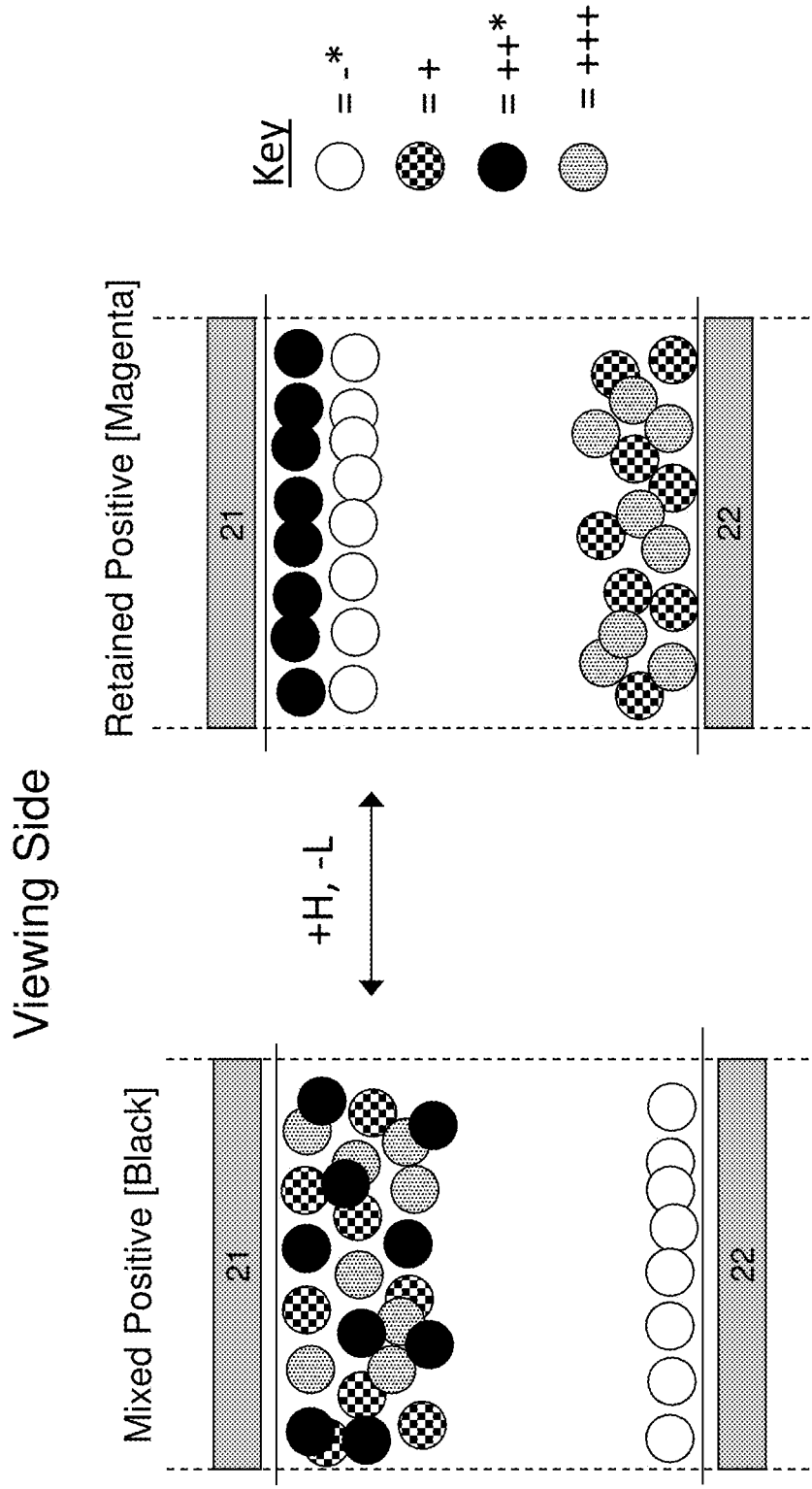
FIG. 2C illustrates a transition between a first optical state having all of the particles of the first charge polarity at the viewing surface and a third optical state having the particles with the second (opposite) polarity behind the middle charged particles of the first polarity, which are located at the viewing surface.
Figure 2D:
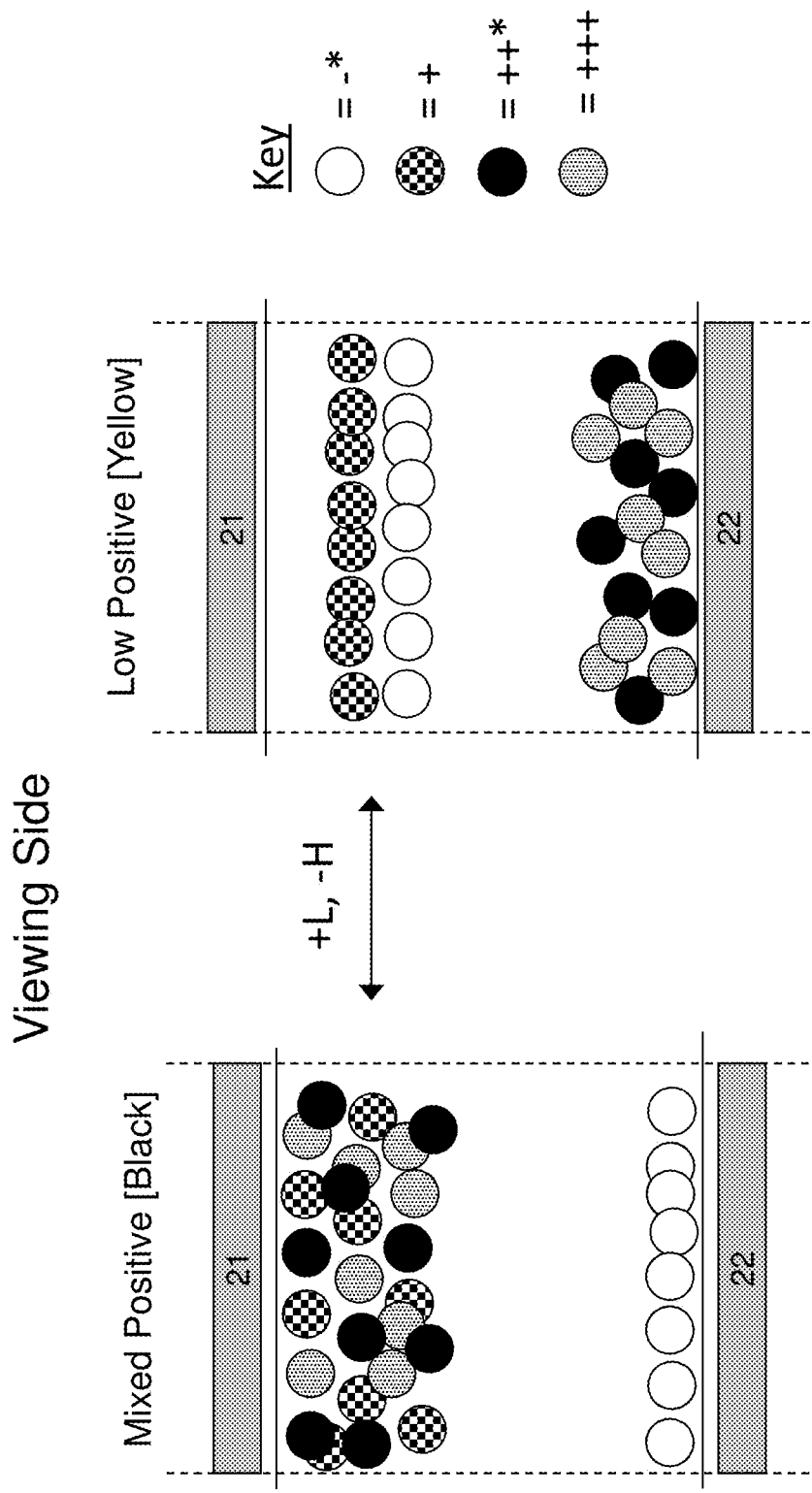
FIG. 2D illustrates a transition between a first optical state having all of the particles of the first charge polarity at the viewing surface and a fourth optical state having the particles with the second (opposite) polarity behind the low charged particles of the first polarity, which are located at the viewing surface.
Figure 2E:
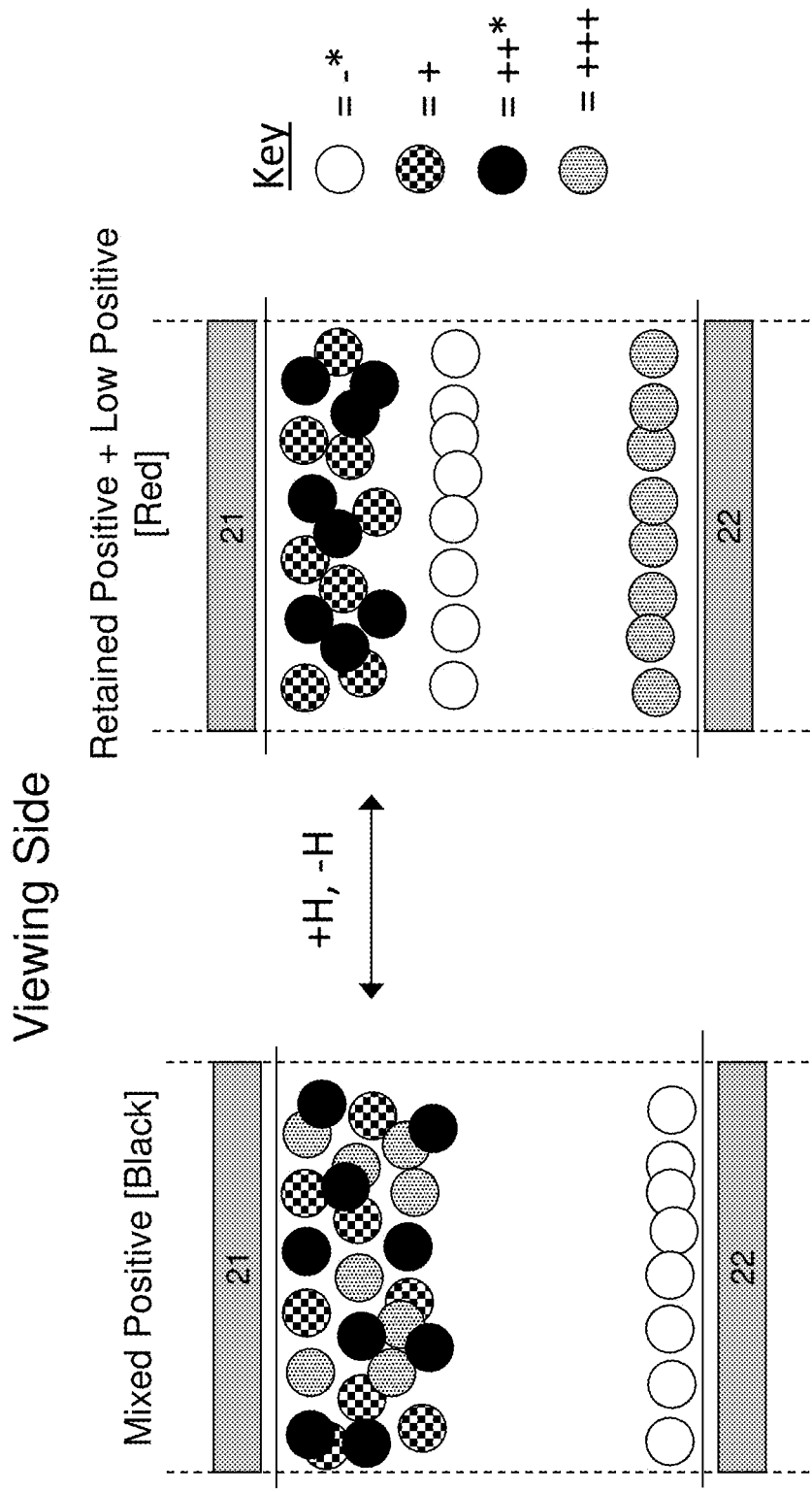
FIG. 2E illustrates a transition between a first optical state having all of the particles of the first charge polarity at the viewing surface and a fifth optical state having the particles with the second (opposite) polarity behind a combination of the low charged particles and the medium charged particles of the first polarity, which are located at the viewing surface.

The motion of the various particles according to one possible hypothesis in the presence of a high (e.g., "±H", e.g., ±20V, e.g., ±25V) electric field and a low (e.g., "±L", e.g., ±5V, e.g., ±10V) electric field are shown in FIGS. 2B-2E. For the purposes of illustration, each box bounded by dashed lines represents a pixel bounded by a top light-transmissive electrode 21 and a bottom electrode 22, which may be a pixel electrode of an active matrix, however it may also be a light-transmissive electrode, or a segmented electrode, etc. Starting from a first state, in which all of the positive particles are present at the viewing surface (nominally black), the electrophoretic medium can be driven to four different optical states, as shown in FIGS. 2B-2E. In the preferred embodiment, this results in a white optical state (FIG. 2B), a magenta optical state (FIG. 2C), a yellow optical state (FIG. 2D), and a red optical state (FIG. 2E). It should be evident that the remaining four optical states of FIG. 1 can be achieved by reversing the order of the initial state and the driving electric fields, as shown in short hand in FIG. 5.

When addressed with a low voltage, as in FIG. 2B, the particles behave according to their relative zeta potentials with relative velocities illustrated by the arrows for the case when a negative voltage is applied to the backplane. Thus, in this example, the cyan particles move faster than the magenta particles, which move faster than the yellow particles. The first (positive) pulse does not change the positions of the particles, since they are already restricted in motion by the walls of the enclosure. The second (negative) pulse exchanges the positions of the colored and white particles, and thus the display switches between black and white states, albeit with transient colors reflecting the relative mobilities of the colored particles. Reversing the starting positions and polarities of the pulses allows for a transition from white to black. Accordingly, this embodiment provides black-white updates that require lower voltages (and consume less power) as compared to other black and white formulations achieved with multiple colors via either a process black or a process white.

In FIG. 2C, the first (positive) pulse is of a high positive voltage, sufficient to reduce the mobility of the magenta particle (i.e., the particle of intermediate mobility of the three positively-charge colored particles). Because of the reduced mobility, the magenta particles essentially remain frozen in place, and a subsequent pulse in the opposite direction, of low voltage, moves the cyan, white and yellow particles more than the magenta particles, thereby producing a magenta color at the viewing surface, with the negative white particles behind the magenta particles. Importantly, if the starting position and the polarities of the pulses are reversed, (equivalent to viewing the display from the side opposite the viewing surface, i.e., through electrode 22), this pulse sequence would produce a green color (i.e., a mixture of yellow and cyan particles).

In FIG. 2D, the first pulse is of a low voltage that does not significantly reduce the mobility of the magenta particles or the white particles. However, the second pulse is of a high negative voltage that reduces the mobility of the white particles. This allows more effective racing between the three positive particles, such that the slowest type of particles (yellow in this example) remains visible in front of the white particle, whose movement was diminished with the earlier negative pulse. Notably, the yellow particles to not make it to the top surface of the cavity containing the particles. Importantly, if the starting position and the polarities of the pulses are reversed, (equivalent to viewing the display from the side opposite the viewing surface, i.e., through electrode 22), this pulse sequence would produce a blue color (i.e., a mixture of magenta and cyan particles).

FIG. 2E shows that when both pulses are of high voltage, the magenta particle mobility would be reduced by the first high positive pulse, and the racing between cyan and yellow would be enhanced by the reduction in white mobility caused by the second high negative pulse. This produces a red color. Importantly, if the starting position and the polarities of the pulses are reversed, (equivalent to viewing the display from the side opposite the viewing surface, i.e., through electrode 22), this pulse sequence would produce a cyan color.

To obtain a high-resolution display, individual pixels of a display should be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode, which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

Conventionally, each pixel electrode has associated therewith a capacitor electrode such that the pixel electrode and the capacitor electrode form a capacitor; see, e.g., International Patent Application WO2001007961. In some embodiments, N-type semiconductor (e.g., amorphous silicon) may be used to from the transistors and the "select" and "non-select" voltages applied to the gate electrodes can be positive and negative, respectively.

Figure 3:
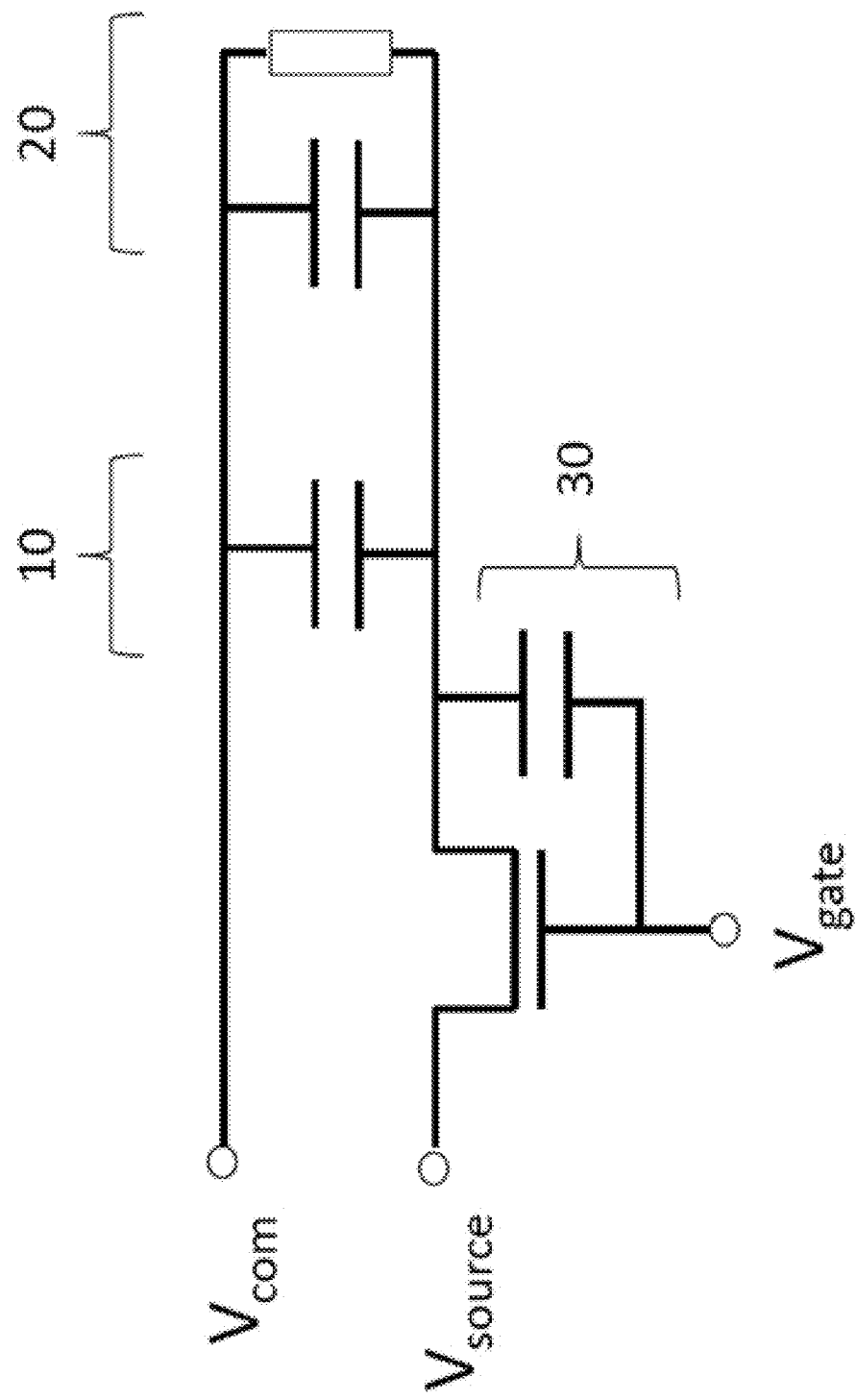
FIG. 3 illustrates an exemplary equivalent circuit of a single pixel of an EPD.

FIG. 3 of the accompanying drawings depicts an exemplary equivalent circuit of a single pixel of an EPD. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.

Problems may arise, however, when $V_{com}$ is set to a voltage that is not compensated for the kickback voltage. This may occur when it is desired to apply a higher voltage to the display than is available from the backplane alone. It is well known in the art that, e.g., the maximum voltage applied to the display may be doubled if the backplane is supplied with a choice of a nominal +V, 0, or −V, e.g., while $V_{com}$ is supplied with −V. The maximum voltage experienced in this case is +2V (i.e., at the backplane relative to the top plane), while the minimum is zero. If negative voltages are needed, the $V_{com}$ potential must be raised at least to zero. Waveforms used to address a display with positive and negative voltages using top plane switching must therefore have particular frames allocated to each of more than one $V_{com}$ voltage setting.

A set of waveforms for driving a color EPD having four particles described in U.S. Pat. No. 9,921,451, which is incorporated by reference herein. In U.S. Pat. No. 9,921,451, seven different voltages are applied to the pixel electrodes: three positive, three negative, and zero. However, in some cases, the maximum voltages used in these waveforms are higher than that can be handled by amorphous silicon thin-film transistors. In such instances, suitable high voltages can be obtained by the use of top plane switching. When (as described above) $V_{com}$ is deliberately set to $V_{KB}$, a separate power supply may be used. It is costly and inconvenient, however, to use as many separate power supplies as there are $V_{com}$ settings when top plane switching is used. Furthermore, top plane switching is known to increase kickback, thereby degrading the stability of the color states.

A display device may be constructed using an electrophoretic fluid in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 4:
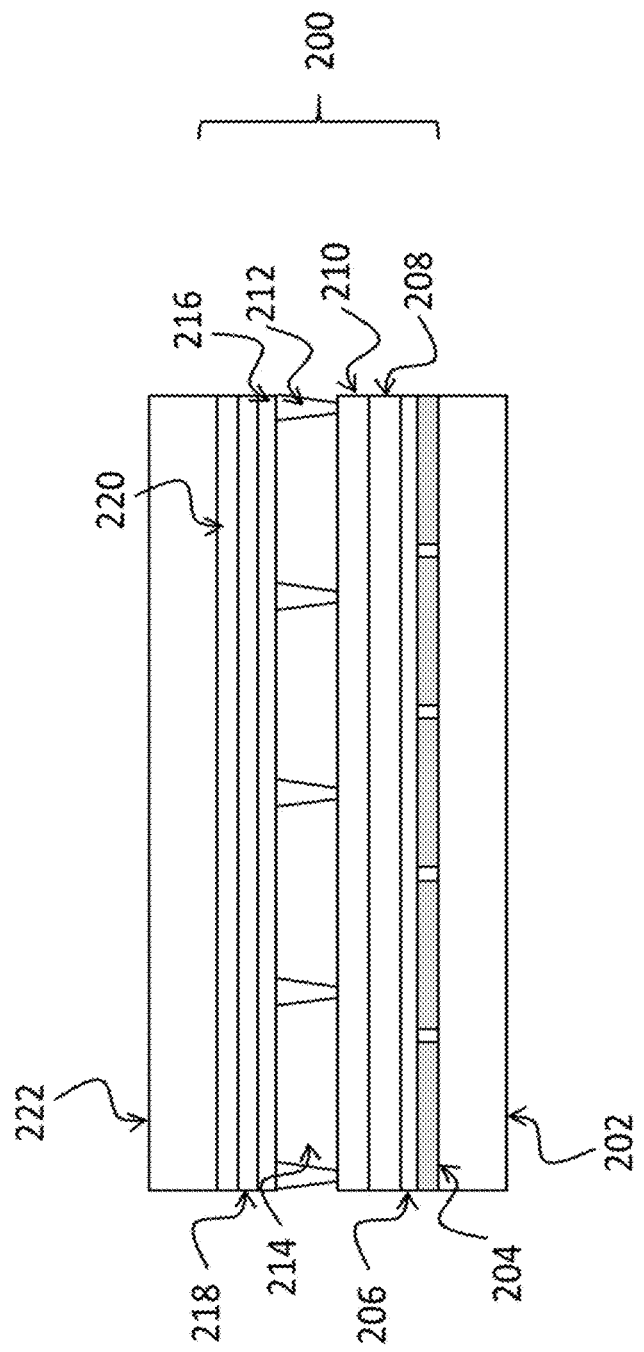
FIG. 4 is a simplified illustration showing the layers of an exemplary EPD.

FIG. 4 shows a schematic, cross-sectional drawing (not to scale) of a display structure 200 including an electrophoretic medium. In display 200, the electrophoretic fluid is illustrated as being confined to microcells, although other structures, e.g., microcapsules may also be used. Substrate 202, which may be glass or plastic, bears pixel electrodes 204 that are either individually addressed segments or associated with thin film transistors in an active matrix arrangement. (The combination of substrate 202 and electrodes 204 is conventionally referred to as the back plane of the display.) Layer 206 is an optional dielectric layer according to the invention applied to the backplane. (Methods for depositing a suitable dielectric layer are described in U.S. Patent Publication No. 2020/0348576, incorporated by reference.) The front plane of the display comprises transparent substrate 222 that bears a transparent, electrically conductive coating 220. Overlying electrode layer 220 is an optional dielectric layer 218. Layer (or layers) 216 are polymeric layer(s) that may comprise a primer layer for adhesion of microcells to transparent electrode layer 220 and some residual polymer comprising the bottom of the microcells. The walls of the microcells 212 are used to contain the electrophoretic fluid 214. The microcells are sealed with layer 210 and the whole front plane structure is adhered to the backplane using electrically-conductive adhesive layer 208. Processes for forming the microcells are described in the prior art, e.g., in U.S. Pat. No. 6,930,818. In some instance, the microcells are less than 20 µm in depth, e.g., less than 15 µm in depth, e.g., less than 12 µm in depth, e.g., about 10 µm in depth, e.g., about 8 µm in depth.

Most commercial EPDs use amorphous silicon based thin-film transistors (TFTs) in the construction of active matrix backplanes (202/024) because of the wider availability of fabrication facilities and the costs of the various starting materials. Unfortunately, amorphous silicon thin-film transistors become unstable when supplied gate voltages that would allow switching of voltages higher than about +/−15V. Nonetheless, as described below, the performance of ACeP is improved when the magnitudes of the high positive and negative voltages are allowed to exceed +/−15V. Accordingly, as described in previous disclosures, improved performance is achieved by additionally changing the bias of the top light-transmissive electrode with respect to the bias on the backplane pixel electrodes, also known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, e.g., U.S. Pat. No. 9,921,451.

These waveforms require that each pixel of the display can be driven at five different addressing voltages, designated $+V_{high}$, $+V_{low}$, 0, $-V_{low}$ and $-V_{high}$, illustrated as 30V, 15V, 0, −15V and −30V. In practice, it may be preferred to use a larger number of addressing voltages. If only three voltages are available (i.e., $+V_{high}$, 0, and $-V_{high}$) it may be possible to achieve the same result as addressing at a lower voltage (say, $V_{high}/n$ where n is a positive integer >1) by addressing with pulses of voltage $V_{high}$ but with a duty cycle of 1/n.

Figure 5:
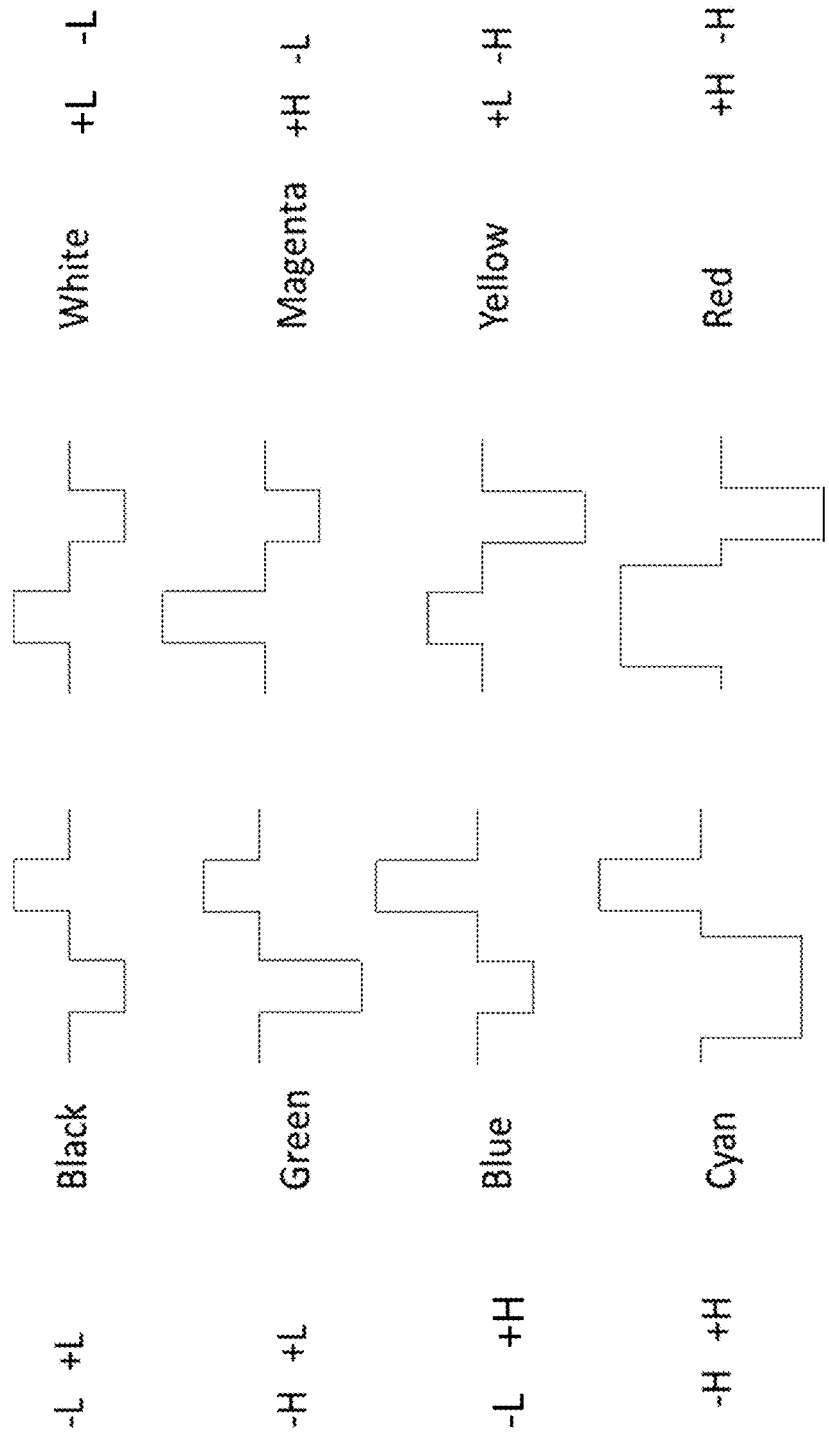
FIG. 5 shows exemplary push-pull drive waveforms having five voltage levels for addressing a four-particle electrophoretic medium having white, yellow, magenta, and cyan particles.
Figure 6:
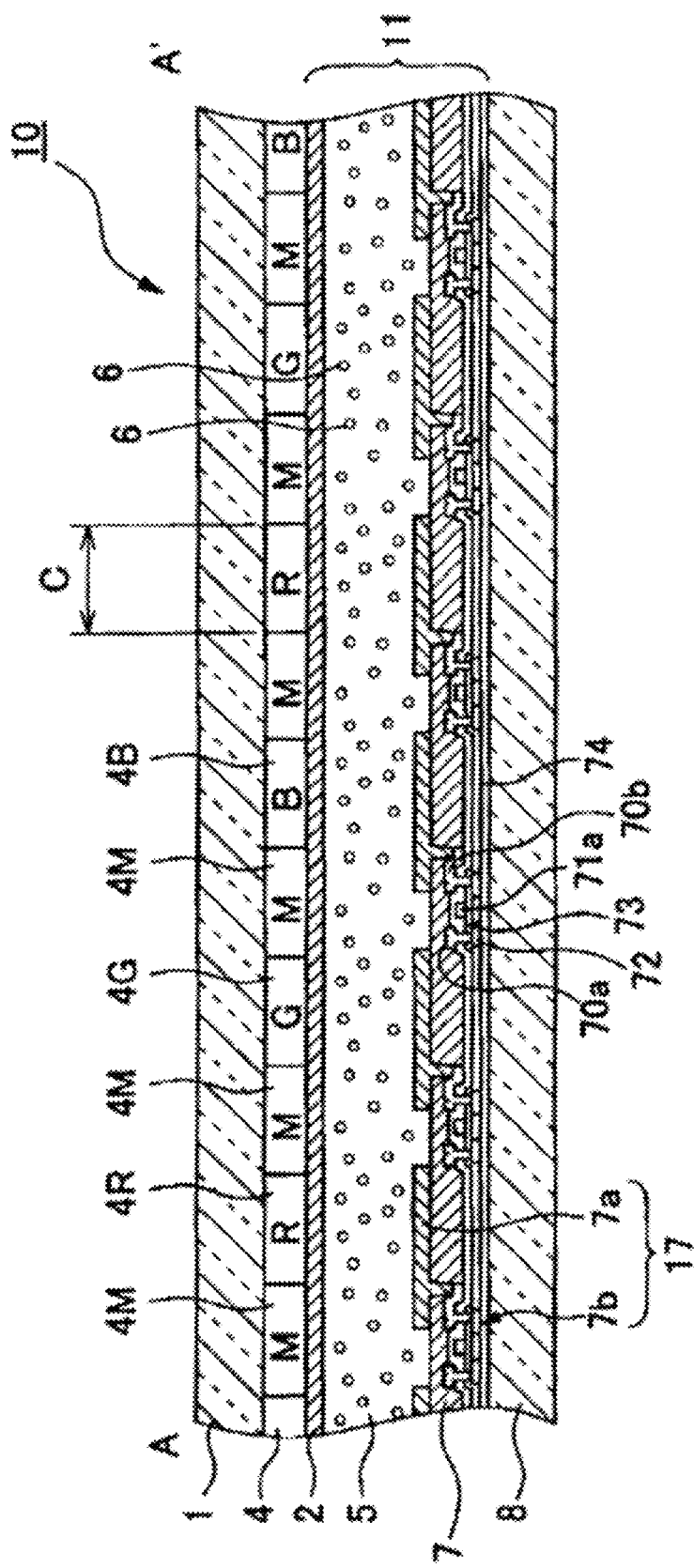
FIG. 6 is a simplified sectional view of an EPD having a CFA.

FIG. 5 shows typical waveforms (in simplified form) used to drive the four-particle color electrophoretic display system described above. Such waveforms have a "push-pull" structure: i.e., they consist of a dipole comprising two pulses of opposite polarity. The magnitudes and lengths of these pulses determine the color obtained. The waveforms have five such voltage levels. FIG. 5 shows high and low positive and negative voltages, as well as zero volts. Typically, "low" (L) refers to a range of about 5-15V, while "high" (H) refers to a range of about 15-30V. In general, the higher the magnitude of the "high" voltages, the better the color gamut achieved by the display. An additional "medium" (M) level may also be used, which is typically around 15V; however, the value for M will depend somewhat on the composition of the particles, as well as the environment of the electrophoretic medium.

Although FIG. 5 shows the simplest dipoles required to form colors, it will be appreciated that practical waveforms may use multiple repetitions of these patterns, or other patterns that are aperiodic.

Of course, achieving the desired color with the driving pulses of FIG. 5 is contingent on the particles starting the process from a known state, which is unlikely to be the last color displayed on the pixel. Accordingly, a series of reset pulses precede the driving pulses, which increases the amount of time required to update a pixel from a first color to a second color. The reset pulses are described in greater detail in U.S. Pat. No. 10,593,272, incorporated by reference. The lengths of these pulses (refresh and address) and of any rests (i.e., periods of zero voltage between them may be chosen so that the entire waveform (i.e., the integral of voltage with respect to time over the whole waveform) is DC balanced (i.e., the integral of voltage over time is substantially zero). DC balance can be achieved by adjusting the lengths of the pulses and rests in the reset phase so that the net impulse supplied in the reset phase is equal in magnitude and opposite in sign to the net impulse supplied in the address phase, during which phase the display is switched to a particular desired color. As shown in the FIGS. 2B-2E, however, the starting state for the eight primary colors is either a black or white state, which can be achieved with a sustained low voltage driving pulse. The simplicity of achieving this start state further reduces the time of updates between states, which is more pleasing for the user and also reduces the amount of power consumed (thus increasing battery life).

In addition, the foregoing discussion of the waveforms, and specifically the discussion of DC balance, ignores the question of kickback voltage. In practice, as previously, every backplane voltage is offset from the voltage supplied by the power supply by an amounts equal to the kickback voltage $V_{KB}$. Thus, if the power supply used provides the three voltages +V, 0, and −V, the backplane would actually receive voltages V+$V_{KB}$, $V_{KB}$, and −V+$V_{KB}$ (note that $V_{KB}$, in the case of amorphous silicon TFTs, is usually a negative number). The same power supply would, however, supply +V, 0, and −V to the front electrode without any kickback voltage offset. Therefore, e.g., when the front electrode is supplied with −V the display would experience a maximum voltage of 2V+$V_{KB}$ and a minimum of $V_{KB}$. Instead of using a separate power supply to supply $V_{KB}$ to the front electrode, which can be costly and inconvenient, a waveform may be divided into sections where the front electrode is supplied with a positive voltage, a negative voltage, and $V_{KB}$.

EPD with Frontlighting System

Various embodiments disclosed herein relate to an EPD with an ambient light sensor and a frontlight for adaptively restoring whiteness and balancing color on the display.

Figure 7:
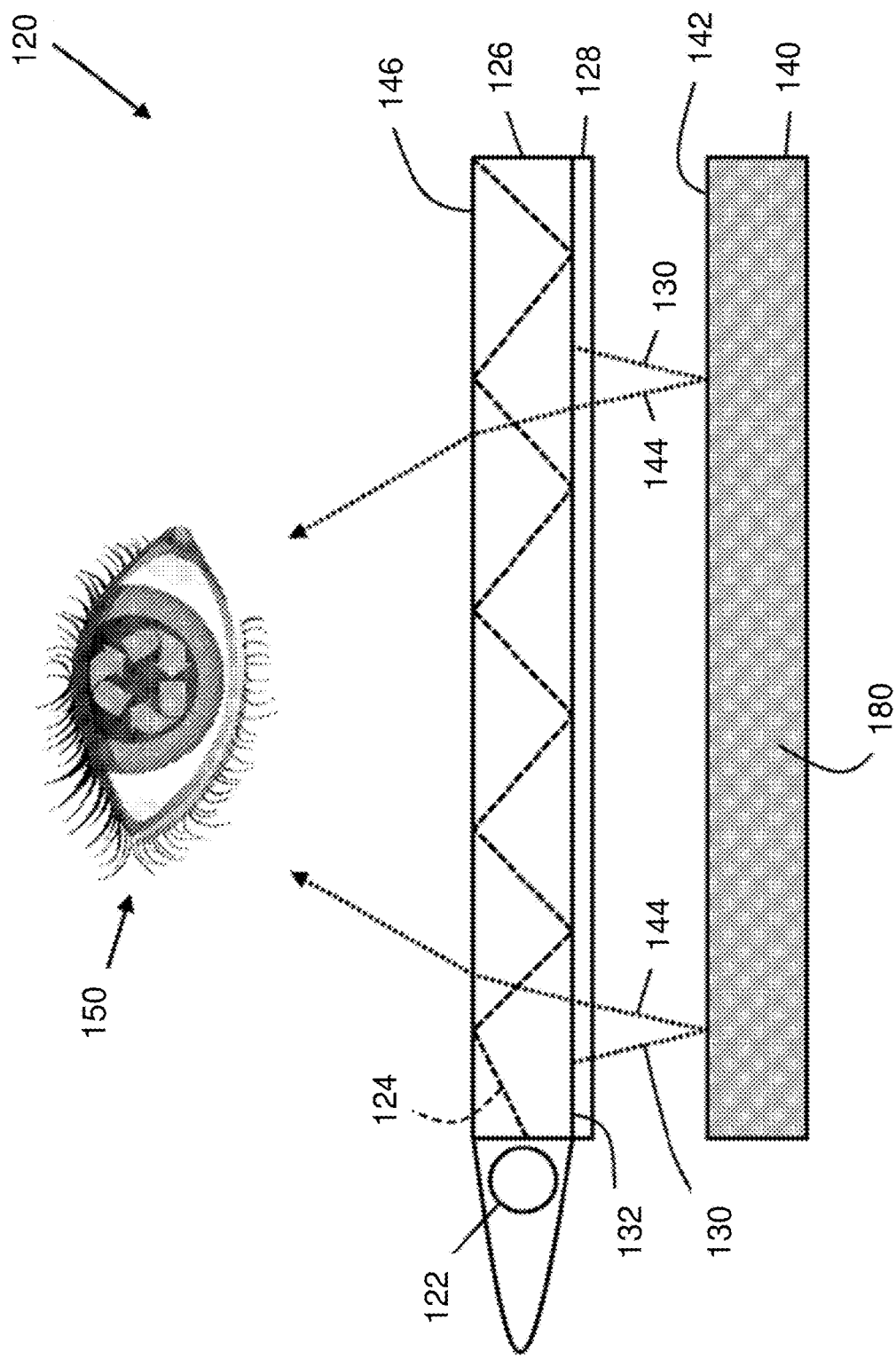
FIG. 7 is a simplified sectional view of an EPD with an ILU.

U.S. Pat. No. 8,690,408, the content of which is incorporated herein by reference in its entirety, discloses an exemplary front lighting system for an EPD, implemented as an ILU, to illuminate the EPD viewing surface in low ambient light environments. FIG. 7, reproduced from that patent, shows a simplified sectional view of an illuminated display device 120. A light source 122 injects or emits light 124 into a waveguide 126. The light 124 may be injected at an angle such that total internal reflection (TIR) is obtained. Because the injected light 124 is totally internally reflected within the waveguide 126, a frustrator 128 is provided to cause frustrated light 130 to exit the bottom surface 132 of the waveguide 126. The frustrated light 130 is directed downward and onto an EPD 180. Because the waveguide 126 is disposed above the array 140 of pixel elements of the EPD 180, the frustrated light 130 is incident on the EPD upper surface 142, thus illuminating the array 140 of pixel elements from above. Reflected light 144 reflects off the upper surface 142 of the array 140 of pixel elements and travels back into the waveguide 126. The reflected light 144 propagates through the waveguide 126 and exits an outer surface 146 of the waveguide 126. The reflected light 144 thus presents to a viewer's eye 150 an image created by the array 140 of pixel elements. FIG. 7 thus illustrates a top-lit arrangement in which the array 140 of pixel elements is illuminated from above.

The waveguide 126 of the ILU can be a light guide sheet laminated to the front viewing side of the EPD 180. The light source 122 can be one or more edge-mounted light-emitting diodes (LEDs) coupled into the light guide sheet where total internal reflection propagates it parallel to the EPD surface. The frustrator 128 can be a distribution of light-turning microstructures (scattering, reflecting, or refracting) that direct light toward the reflecting electrophoretic layer.

Figure 8:
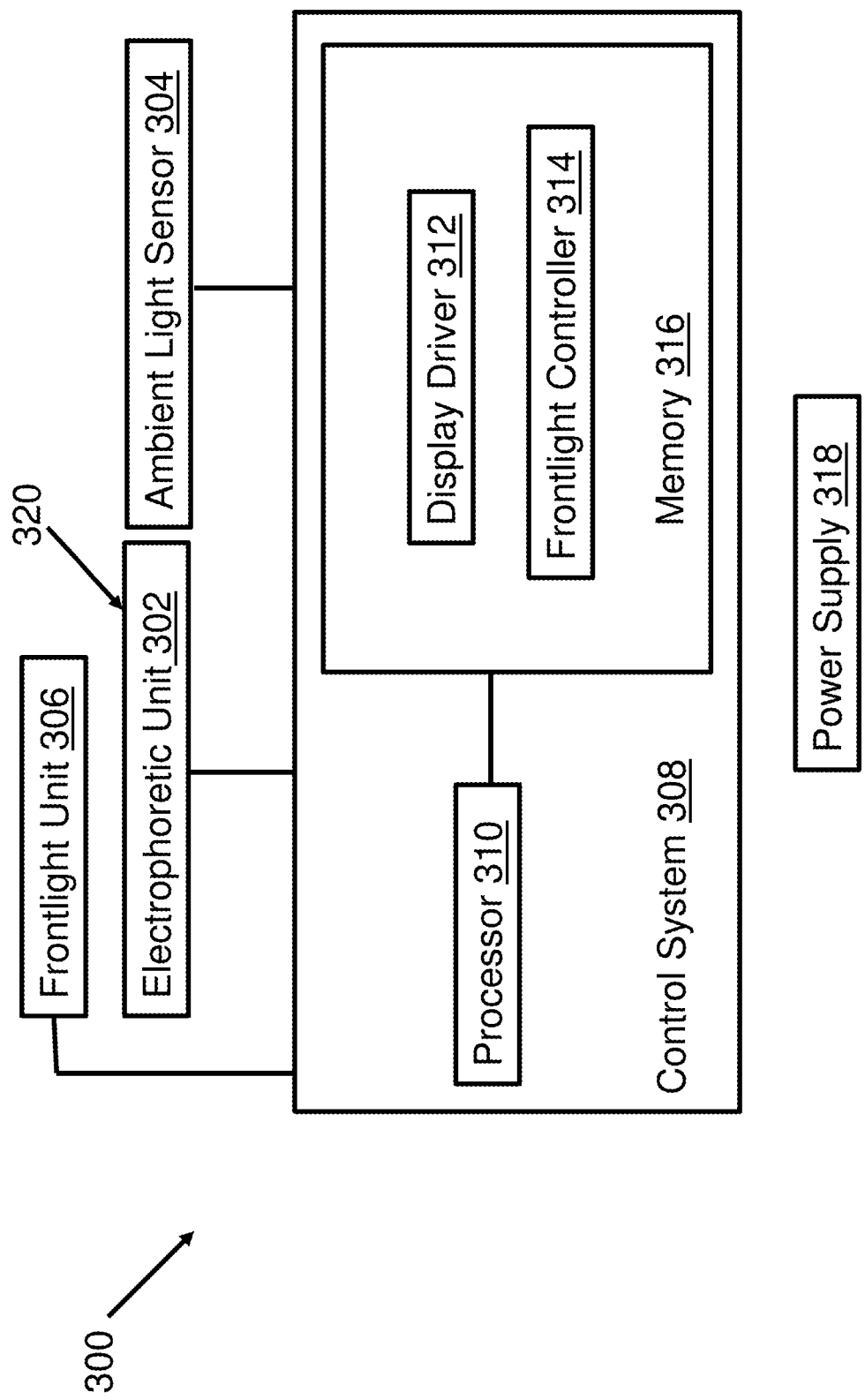
FIG. 8 is a simplified block diagram of an exemplary EPD with an adaptive frontlighting system in accordance with one or more embodiments.

FIG. 8 is a simplified block diagram illustrating an exemplary electrophoretic display apparatus 300 in accordance with one or more embodiments. The apparatus 300 includes an EPD unit 302, which can be any type of EPD known in the art including ACeP, EPDs with CFAs, and other EPDs described above.

The apparatus 300 also includes one or more ambient light sensors 304 embedded in the EPD unit housing at the viewing surface 320 for detecting the level of ambient illuminance incident on the viewing surface 320 of the EPD unit 302.

The apparatus 300 also includes a frontlight unit 306 (which can be implemented as an ILU) disposed above the viewing surface 320 of the EPD unit 302. The frontlight unit 306 illuminates the viewing surface 320 similar, e.g., to the ILUs disclosed above.

A control system 308 including one or more processors 310 controls operation of the EPD unit 302 and the frontlight unit 306. The one or more processors 310 can execute a display driver process 312 for driving the EPD unit 302 among a plurality of optical states. Similar to the EPDs described above, in this way, the control system 308 can control a source driver of the EPD unit 302 to apply selected voltages from the power supply 318 to selected pixel electrodes to render a display output.

The one or more processors 310 also execute a frontlight controller process 314 for controlling operation of the frontlight unit 306 responsive to outputs received from the ambient light sensors 304 as discussed in further detail below. The display driver 312 and the frontlight controller 314 processes can be stored in a memory 316 in the control system 308. The power supply (e.g., a battery) 318 provides power to the various components of the apparatus.

The one or more processors 310 can comprise microcontrollers, microprocessors, application-specific integrated circuits (ASICs), field programmable gate arrays (FPGA), or any general-purpose or special-purpose circuitry that can be programmed or configured to perform the functions described herein.

The ambient light sensor 304 is a surface light sensor with the optical and spectral characteristics of an illuminance meter or lux meter.

The ambient light sensor 304 measures the illuminance $E_{AMB}$ of ambient illumination incident on the viewing surface 320 of the EPD 302. White pigment displayed on the EPD viewing surface 320 reflects not only the light emitted by the frontlight unit 306, but also the ambient illumination. From physical models of light reflection off the display, it has been determined that the total luminance (brightness) of the display in a white state ($L_W$) is the sum of the luminance $L_{W, FL}$ from the reflected frontlight illumination $E_{FL}$ and the luminance $L_{W_{AMB}}$ from reflected ambient illumination $E_{AMB}$. The illuminance $E_{FL}$ incident on the EPD's white pigment from the frontlight unit 306 is the luminous flux $\Phi_{FL}$ emitted from the frontlight LEDs divided by the area $A_{FL}$ of the frontlight sheet (equal to the display or viewing surface area). Optical losses are considered by the frontlight efficiency $\eta_{FL}$.

Assuming diffuse illumination from the frontlight and ambient illumination, the luminance of the EPD display for each of these illumination components is the product of its diffuse reflectance factor in white state $R_W$ and the illuminance E divided by $\pi$. The total display luminance $L_W$ in white state under combined front and ambient illumination is $$L_W = \left(\frac{\phi_{FL}\eta_{FL}}{A_{FL}} + E_{AMB}\right)\frac{R_W}{\pi}$$

-continued $$= (E_{FL} + E_{AMB})\frac{R_W}{\pi}$$

The ambient illuminance $E_{AMB}$ is not controllable since it can change at any time due to changed positions of the display, time of day, when room lights are switched on or off, etc.

To account for the effect of changing illumination, the ambient illuminance $E_{AMB}$ incident on the EPD (and its changes) is measured using the ambient light sensor 304. The measured ambient illuminance $E_{AMB}$ is then used in an automatic control loop to change the luminous flux output $\Phi_{FL}$ of the LEDs of the frontlight unit 306, which is directly proportional to the frontlight illuminance $E_{FL}$ incident on the EPD. The control of the frontlight illuminance $E_{FL}$ should meet two conditions:

1. Increasing the EPD's total white state luminance $L_W$ to match that of a 100% white diffuse reflector (R=1, 100% white Lambertian reflection) in the same ambient illumination as the EPD; and
2. Maintaining a constant minimum total display luminance $L_{W, min}$ in low-illumination or dark viewing environments, with recommended minimum levels, e.g., 30 cd/m² (approximately the brightness of white paper under 100 lx illumination).

To satisfy condition 1, the difference $\Delta L$ between the total luminance of the EPD in a white state and the luminance of a 100% white diffuse reflector, both under the same ambient illuminance $E_{AMB}$, is compensated for by the front light illumination:

$$\Delta L = L_{FL} = \frac{E_{AMB}}{\pi}(1 - R_W)$$

Substituting frontlight luminance $L_{FL}$ by its illuminance $E_{FL}$ and the measured white state reflectance $R_W$ yields the expression for the illuminance $E_{FL}$ the front light has to provide at any level of ambient illuminance $E_{AMB}$ to compensate for the EPD's lower white state $R_W$ in comparison to an ideal Lambertian reflector (R=1):

$$E_{FL} = E_{AMB}\left(\frac{1}{R_W} - 1\right)$$

Maintaining a constant minimum total display luminance $L_{WS,min}$ in low-illumination or dark viewing environments requires determining the minimum ambient illuminance threshold $E_{AMB, min}$. Considering the desired 100% white state of $R_W=1$, the threshold is $E_{AMB, min}=\pi L_{min}$. For the example of the CFA color EPD with 53L*, the threshold is at 94 lx. If ambient illuminance $E_{AMB}$ is present, it is subtracted from the desired frontlight illuminance $E_{FL}$ to prevent its contribution from making the EPD brighter than the 100% white diffuse reflector. The required frontlight illuminance in dim lighting conditions, from complete darkness to the threshold $E_{AMB, min}$ is $$E_{FL} = \frac{E_{AMB,min}}{R_W} - E_{AMB}$$

The complete control algorithm that measures $E_{AMB}$ to control $E_{FL}$ considers whether or not $E_{AMB}$ is above, or equal to and below the minimum threshold $E_{AMB, min}$ $$E_{FL} = \begin{cases} E_{AMB}\left(\frac{1}{R_W} - 1\right) & \text{if } E_{AMB} > E_{AMB,min} \\ \frac{E_{AMB,min}}{R_W} - E_{AMB} & \text{if } E_{AMB} \leq E_{AMB,min} \end{cases}$$

From darkness up to the threshold $E_{AMB,min}$, the adaptive frontlight maintains constant total display luminance irrespective of ambient illumination. Above the threshold, it will keep the total ambient display luminance at the same level as a 100% white diffuse reflector would have under the same ambient illumination.

Figure 9:
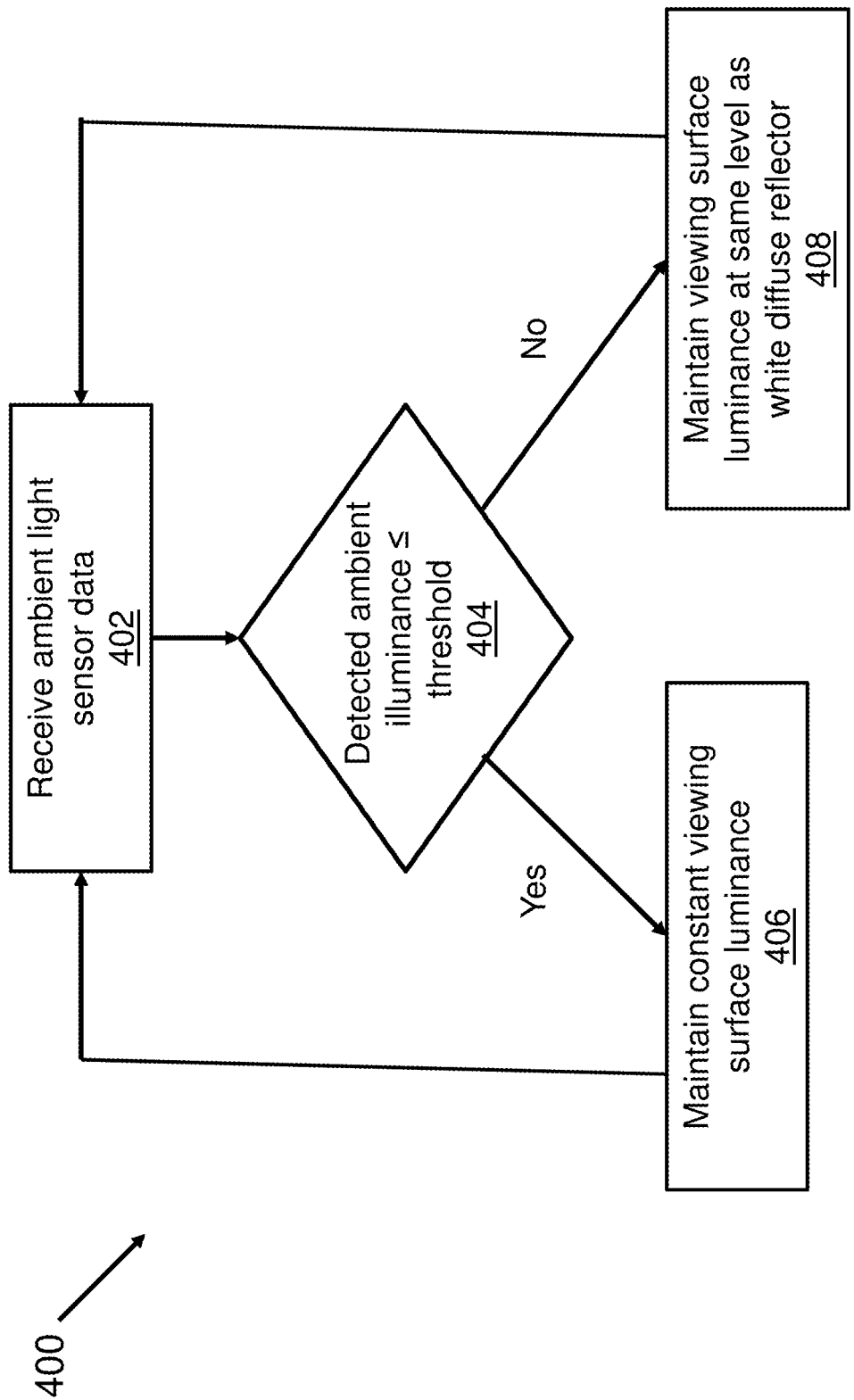
FIG. 9 is a flowchart illustrating an exemplary process for adaptive frontlight control for an EPD in accordance with one or more embodiments.

FIG. 9 is a simplified flowchart illustrating an exemplary process 400 for adaptively controlling EPD display luminance in accordance with one or more embodiments. At step 402, one or more signals are received from an ambient light sensor 304 indicating a detected level of ambient illuminance incident on the viewing surface 320 of an electrophoretic device 302. At step 404, the detected level of ambient illuminance is compared to a predetermined threshold level. At step 406, when the detected level of ambient illuminance is less than or equal to the predetermined threshold level, the frontlight unit 306 is controlled to adaptively maintain a generally constant viewing surface luminance (comprising light reflected by the viewing surface from the frontlight illuminance and the ambient illuminance), irrespective of the detected level of the ambient illuminance. At step 408, when the detected level of ambient illuminance is greater than the predetermined threshold level, the frontlight unit is controlled to maintain the viewing surface luminance at generally the same level as a white diffuse reflector under the same detected level of ambient illuminance. The process is repeatedly performed.

Example

Figure 10B:
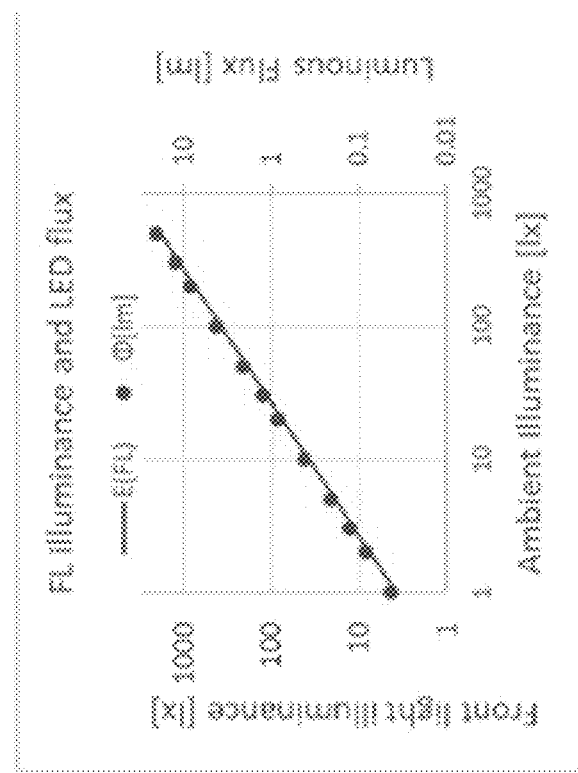
FIG. 10B shows frontlight illuminance and the required luminous flux required to compensate for lower EPD white states.
Figure 10A:
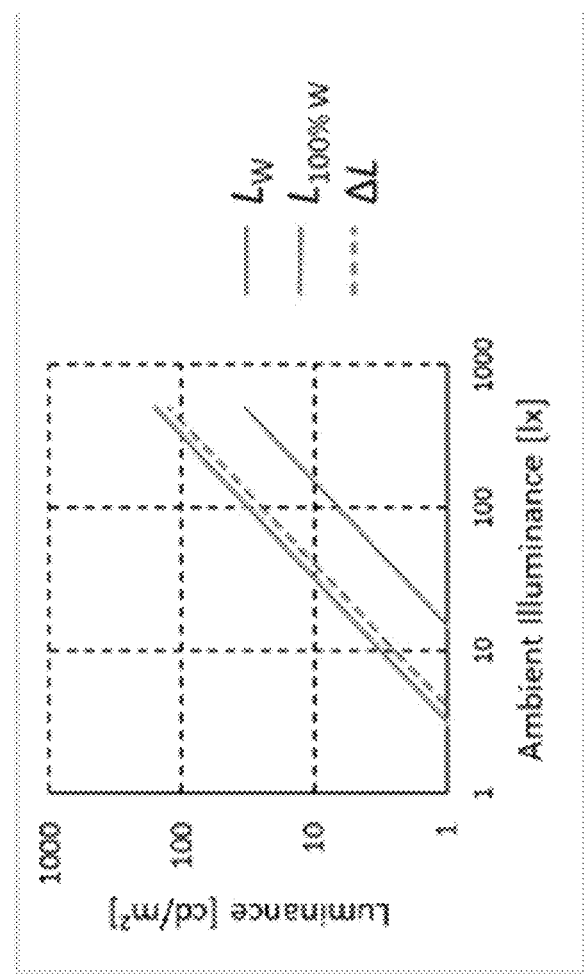
FIG. 10A is a graph showing the white state luminance (without frontlighting) vs. ambient illuminance for an exemplary EPD with 53L* compared to a 100% white Lambertian reflector, and luminance loss $\Delta L$ to be compensated by front light illumination.

FIG. 10A is a graph showing the white state luminance without frontlight vs. ambient illuminance for an exemplary 6-inch CFA color EPD with 53L* white ($L_W$), compared to a 100% white Lambertian reflector ($L_{100\% W}$), and the luminance difference required to be added by frontlight reflection to compensate for the luminance loss $\Delta L$ due to the lower than 100% white state reflectance. FIG. 10B shows the frontlight illuminance and required luminous flux vs. ambient illuminance required for compensation for the lower EPD white state.

The example demonstrates that a maximum front light luminance of only 75 cd/m² is sufficient to brighten the display under ambient illuminance levels of up to 300 lx, typical for indoor or office illumination. This can be achieved in the 6-inch CFA display with LEDs of 12 lm total output. Frontlights commonly used on EPDs achieve a white state luminance of at least 125 cd/m², which would enable white state compensation in an additional range of up to 500 lx ambient illuminance with 20 lm LEDs.

Figure 11B:
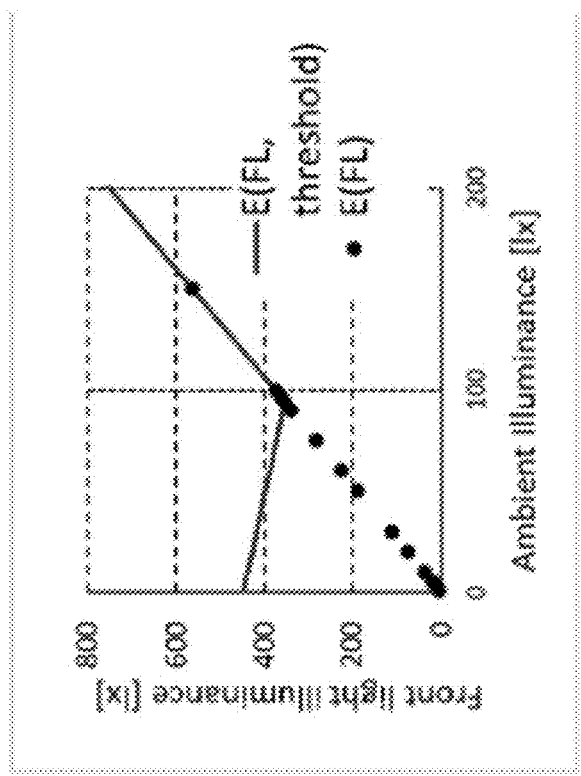
FIG. 11B is a graph showing frontlight illuminance vs. ambient illuminance for the EPD.
Figure 11A:
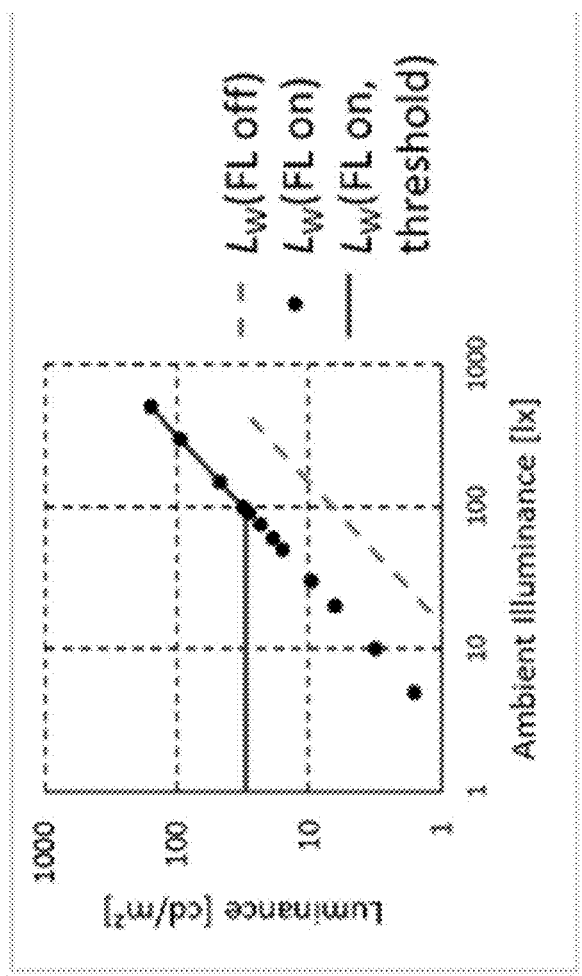
FIG. 11A is a graph showing total white state luminance vs. ambient illuminance for an exemplary EPD in accordance with one or more embodiments.

FIG. 11A shows total white state luminance vs. ambient illuminance for the EPD with the frontlight off $L_W$(FL off) and with frontlight on $L_W$(FL on), without and with minimum threshold switching. FIG. 11B shows that the frontlight illuminance below the threshold is not constant. Starting at its highest level of 448 lx at $E_{AMB}=0$ (darkness), it decreases with increasing $E_{AMB}$ until it reaches the minimum of 355 lx at the threshold. This accounts for the increasing luminance contribution from ambient light reflection when keeping the total display luminance constant. Above the threshold, the frontlight illuminance increases with ambient illuminance so that the display matches the 100% white reference.

EPD with Adaptive Color Balancing

In one or more further embodiments, an EPD is disclosed having an ambient light sensor and a frontlight for adaptively balancing color on the EPD viewing surface. The ambient light sensor in this embodiment comprises a trichromatic sensor with spectral sensitivities in the three RGB color channels. (The wavelengths of the RGB channels are about 620-750 nm for red, 450-495 nm for blue, and 495-570 nm for green.) The sensor can detect the illuminance from the G-channel and also the chrominance and color temperature of the ambient illumination from all three RGB channels using standard colorimetry.

In this embodiment, the frontlight is trichromatic comprising RGB LEDs, instead of white LEDs. Each of the three RGB color channels of the frontlight can be independently controlled, e.g., by varying the electrical current applied to each LED to change the color temperature of the front illumination.

The combination of a trichromatic sensor for detecting ambient illuminance and chrominance and a trichromatic frontlight allows controlling the chrominance of the frontlight illumination so that it can compensate for white states of the EPD that are off-white.

The control algorithm is applied independently to each of the three color channels (R, G, B). It calculates the trichromatic irradiance $(E(R), E(G), E(B))_{FL}$ the front light has to provide at any level of the ambient trichromatic irradiance $(E(R), E(G), E(B))_{AMB}$ measured by the trichromatic sensor to compensate for the EPD's lower than one and non-neutral white state $(R(R), R(G), R(B))_W$ to make the total lightness and color of the display's white state in combined front and ambient light equal to that of an ideal Lambertian reflector $(R(R), R(G), R(B))_W=1$. The threshold for switching from adaptive to constant display luminance and color is $(E(R), E(G), E(B))_{AMB,min}$.

$$E(R)_{FL} = \begin{cases} E(R)_{AMB}\left(\frac{1}{R(R)_W} - 1\right) & \text{if } E(R)_{AMB} > E(R)_{AMB,min} \\ \frac{E(R)_{AMB,min}}{R(R)_W} - E(R)_{AMB} & \text{if } E(R)_{AMB} \leq E(R)_{AMB,min} \end{cases}$$

$$E(G)_{FL} = \begin{cases} E(G)_{AMB}\left(\frac{1}{R(G)_W} - 1\right) & \text{if } E(G)_{AMB} > E(G)_{AMB,min} \\ \frac{E(G)_{AMB,min}}{R(G)_W} - E(G)_{AMB} & \text{if } E(G)_{AMB} \leq E(G)_{AMB,min} \end{cases}$$

$$E(B)_{FL} = \begin{cases} E(B)_{AMB}\left(\frac{1}{R(B)_W} - 1\right) & \text{if } E(B)_{AMB} > E(B)_{AMB,min} \\ \frac{E(B)_{AMB,min}}{R(B)_W} - E(B)_{AMB} & \text{if } E(B)_{AMB} \leq E(B)_{AMB,min} \end{cases}$$

The irradiance of each frontlight color channel $(E(R), E(G), E(B))_{FL}$ can be controlled by varying the electrical current applied to each respective RGB LED of the frontlight unit.

In one or more embodiments, the color channels of the trichromatic sensor and frontlight are realized with spectral characteristics that approximate the CIE 1931 (X, Y, Z) color channels.

In one or more embodiments, the ambient light sensor is a spectral sensor with more than three spectral channels. In addition, the frontlight has more than three color channels that can be independently controlled to change the chrominance of the frontlight illumination.

The combination of a spectral sensor for detecting ambient illuminance and chrominance, and a trichromatic or multispectral frontlight allows finer control of the chrominance of the frontlight illumination so that it can better compensate if the white state of the EPD is off-white.

The control algorithm is applied independently to each of the spectral channels k. It calculates the trichromatic or spectral irradiance $E_{FL}(\lambda)$ the front light has to provide at any level of the ambient spectral irradiance $E_{AMB}(\lambda)$ measured by the spectral sensor to compensate for the EPD's lower than one and non-neutral white state $R_W(\lambda)$ to make the total lightness and color of the display's white state in combined front and ambient light equal to that of an ideal Lambertian reflector $R(\lambda)=1$. The threshold for switching from adaptive to constant display luminance and color is $E_{AMB,min}(\lambda)$.

$$E_{FL}(\lambda) = \begin{cases} E_{AMB}(\lambda)\left(\frac{1}{R_W(\lambda)} - 1\right) & \text{if } E_{AMB}(\lambda) > E_{AMB,min}(\lambda) \\ \frac{E_{AMB,min}(\lambda)}{R_W(\lambda)} - E_{AMB}(\lambda) & \text{if } E_{AMB}(\lambda) \leq E_{AMB,min}(\lambda) \end{cases}$$

Example

The following example utilized an experimental ACeP display in which the white state was low and also off-white with an undesirable yellow tint. The ambient illumination measured with a trichromatic or spectral sensor was approximately CIE D50. The display device included a front light having three independently controllable LEDs with R, G, and B peak wavelengths and half widths of 630±16, 540±37, and 460±18 nm, respectively.

Figures 12A, 12B, 12C, 12D:
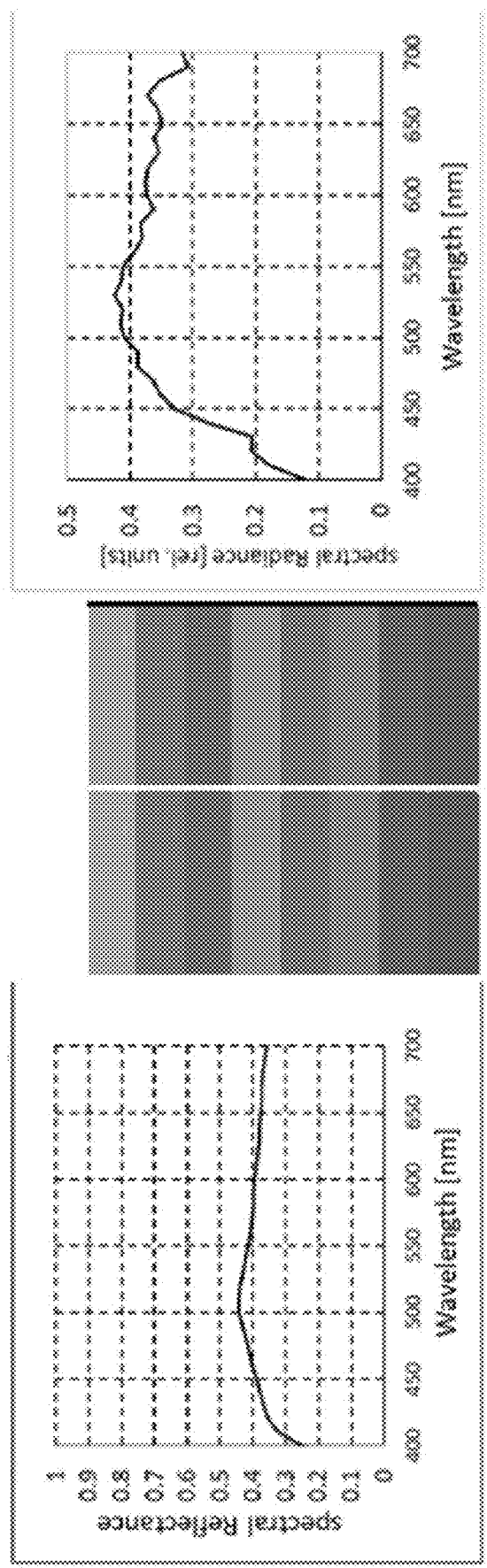
FIG. 12A is a graph showing the measured spectral reflectance of the white state of an exemplary EPD.
FIG. 12B shows reflective display colors without frontlighting.
FIG. 12C shows the display colors in ambient D50 illumination.
FIG. 12D is a graph showing the spectral radiance of the white state in ambient D50 illumination.

The diffuse spectral reflectance of the white state was measured with a spectrophotometer. Its off-white characteristics and the 1976 CIELAB colors calculated from the spectral reflectance were L*=70, a*=−5.4, b*=2.3. FIG. 12A shows the measured spectral reflectance of white state, and FIG. 12B shows the reflective display colors. FIG. 12C shows the display colors in ambient D50 illumination. The ambient illumination with the CIE D50 spectral characteristic amplifies the yellow tint, with its CIELAB colors calculated from the measured spectral display radiance in white state shown in FIG. 12D were even more chromatic, with L*=70, a*=−9.7, b*=10.2.

Figures 13A, 13B, 13C, 13D:
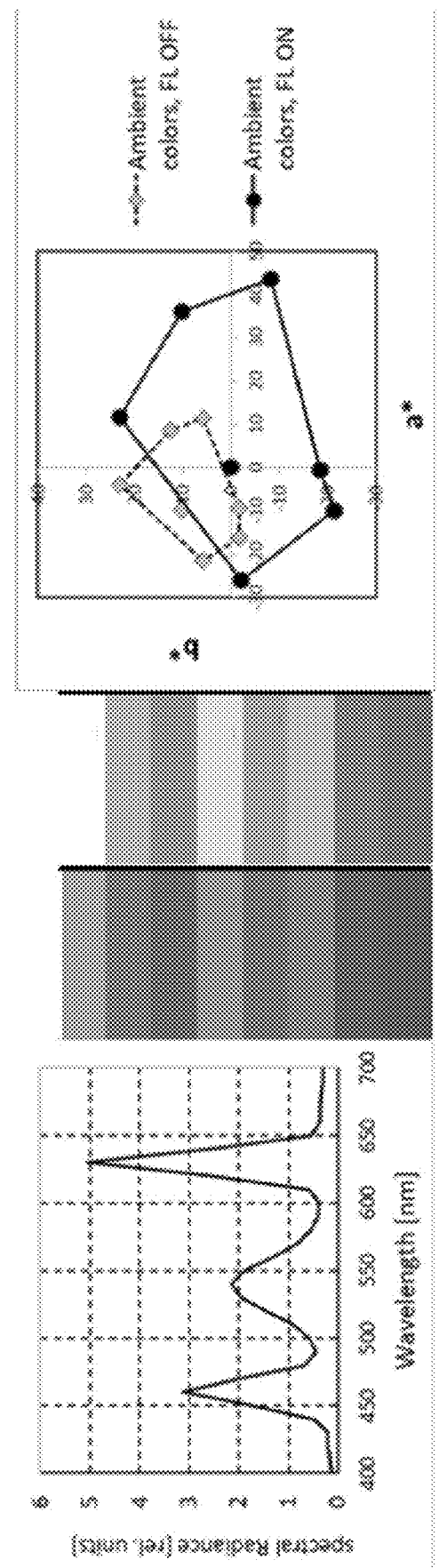

A frontlight illumination of 900 lx was used in combination with 300 lx of D50 ambient illumination. Applying the control algorithm to this combined illumination and the white state reflectance spectrum shown in FIG. 12A yielded the relative electrical currents to be applied to the RGB LEDs as $I_R$=100%, $I_G$=76% and $I_B$=73%. The resulting white state in the combined frontlight and ambient illumination shown in FIG. 13A is not only equal in lightness compared to the 100% white diffuse reflector (L*=100), but also color-balanced (a*=b*=0). FIGS. 12B and 12C show the display colors in ambient D50 illumination without frontlight illumination and with frontlight illumination, respectively. The additional benefit of a brighter, balanced white is a visible improvement of the lightness and saturation of the other display colors. The color gamut area with the adaptive, color balancing frontlight switched on shown in FIG. 13D is not only expanded but also centered around a neutral white of L*=100, a*=b*=0.

The adaptive EPD front lighting provides significant technical advantages over the prior art. The model-based processes improve the paper-like appearance of the white state by increasing the white state of the EPD in a wide range of levels ambient illuminance levels to that of a 100% white diffuse reflector. Additionally, the adaptive frontlighting removes color tint from the white state. It compensates for technology-related shortcomings of EPDs such as low white state lightness and undesirable color tint of white state. The frontlighting increases the white state and removes color tint adaptively when illuminance and color temperature of the ambient illumination change. The frontlighting provides a minimum constant display luminance and chrominance in dim and dark viewing environments. It minimizes battery drain from frontlight usage thus lengthening battery life. The adaptive frontlighting also minimizes exposure to potentially harmful blue light by keeping the frontlight radiance at the minimum necessary level, providing users with a more comfortable, eye-safe viewing experience.

The processes of the frontlight control system described above may be implemented in software, hardware, firmware, or any combination thereof. The processes are preferably implemented in one or more computer programs executing on one or more processors. Each computer program can be a set of instructions (program code) in a code module resident in the random access memory of the control system. Until required by the controller, the set of instructions may be stored in another computer memory or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

The invention claimed is:

1. An electrophoretic display apparatus, comprising:
an electrophoretic device having a viewing surface;
a drive system coupled to the electrophoretic device for driving the electrophoretic device among a plurality of optical states;
one or more ambient light sensors at the viewing surface of the electrophoretic device for detecting a level of ambient illuminance incident on the viewing surface;
a frontlight unit disposed above the viewing surface of the electrophoretic device for illuminating the viewing surface; and
a frontlight control system coupled to the one or more ambient light sensors and the frontlight unit, and configured to:
  (a) receive, from the one or more ambient light sensors, one or more signals indicating a detected level of ambient illuminance incident on the viewing surface of the electrophoretic device;
  (b) compare the detected level of ambient illuminance to a predetermined threshold level;
  (c) when the detected level of ambient illuminance is less than or equal to the predetermined threshold level, control frontlight illuminance incident on the viewing surface from the frontlight unit to adaptively maintain a constant viewing surface luminance comprising light reflected by the viewing surface from the frontlight illuminance and the ambient illuminance, irrespective of the detected level of the ambient illuminance;
  (d) when the detected level of ambient illuminance is greater than the predetermined threshold level, control the frontlight illuminance incident on the viewing surface from the frontlight unit to maintain the viewing surface luminance at generally the same level as a white diffuse reflector under the same detected level of ambient illuminance, wherein the white diffuse reflector comprises a Lambertian reflective surface having a value of $L^*=100$; and
  (e) repeat steps (a) through (d) a plurality of times;
wherein the one or more ambient light sensors include at least one trichromatic sensor for detecting ambient trichromatic irradiance in red, green, and blue color channels incident on the viewing surface;
the frontlight unit includes at least one trichromatic light source comprising independently controllable red, green, and blue color channels; and
the frontlight control system is further configured to
  (f) receive, from the one or more ambient light sensors, one or more signals indicating a detected level of ambient trichromatic irradiance in the red, green, and blue color channels incident on the viewing surface;
  (g) compare the detected level of ambient trichromatic irradiance to a predetermined threshold level in each of the red, green, and blue color channels;
  (h) when the detected level of ambient trichromatic irradiance is less than or equal to the predetermined threshold level in any of the red, green, and blue color channels, control the frontlight illuminance incident on the viewing surface from the frontlight unit in that channel to adaptively maintain a constant level of trichromatic irradiance comprising the trichromatic irradiance reflected by the viewing surface from the frontlight illuminance and the ambient trichromatic irradiance, irrespective of the detected level of the ambient trichromatic irradiance;
  (i) when the detected level of ambient trichromatic irradiance is greater than the predetermined threshold level in any of the red, green, and blue color channels, control the frontlight illuminance incident on the viewing surface from the frontlight unit in that channel to maintain the viewing surface trichromatic irradiance at generally the same level as an ideal Lambertian reflector under the same detected level of ambient trichromatic irradiance; and
  (j) repeat steps (f) through (i) a plurality of times.

2. The electrophoretic display apparatus of claim 1, wherein the frontlight illuminance incident on the viewing surface from the frontlight unit is controlled in step (c) according to:

$$E_{FL} = \frac{E_{AMB,min}}{R_W} - E_{AMB} \text{ if } E_{AMB} \leq E_{AMB,min}$$

where $E_{FL}$ is the illuminance incident on the viewing surface from the frontlight unit, $E_{AMB}$ is the detected level of ambient illuminance incident on the viewing surface, $E_{AMB, MIN}$ is the predetermined threshold level, and $R_W$ is the diffuse reflectance factor of the viewing surface in a white state.

3. The electrophoretic display apparatus of claim 1, wherein the frontlight illuminance incident on the viewing surface from the frontlight unit is controlled in step (d) according to:

$$E_{FL} = E_{AMB}\left(\frac{1}{R_W} - 1\right) \text{ if } E_{AMB} > E_{AMB,min}$$

where $E_{FL}$ is the illuminance incident on the viewing surface from the frontlight unit, $E_{AMB}$ is the detected level of ambient illuminance incident on the viewing surface, $E_{AMB, MIN}$ is the predetermined threshold level, and $R_W$ is the diffuse reflectance factor of the viewing surface in a white state.

4. The electrophoretic display apparatus of claim 1, wherein the threshold level is between 3 lx and 500 lx.

5. The electrophoretic display apparatus of claim 1, wherein the threshold level is about 94 lx.

6. The electrophoretic display apparatus of claim 1, wherein:
the one or more ambient light sensors include at least one trichromatic sensor for detecting ambient trichromatic irradiance in red, green, and blue color channels incident on the viewing surface;
the frontlight unit includes at least one trichromatic light source comprising independently controllable red, green, and blue color channels; and
the frontlight control system is further configured to control the chrominance of illumination from the at least one trichromatic light source to compensate for white states of the electrophoretic device that are off-white.

7. The electrophoretic display apparatus of claim 1, wherein the frontlight illuminance incident on the viewing surface from the frontlight unit is controlled in step (c) according to:

$$E(R)_{FL} = \frac{E(R)_{AMB,min}}{R(R)_W} - E(R)_{AMB} \text{ if } E(R)_{AMB} \leq E(R)_{AMB,min}$$

$$E(G)_{FL} = \frac{E(G)_{AMB,min}}{R(G)_W} - E(G)_{AMB} \text{ if } E(G)_{AMB} \leq E(G)_{AMB,min}$$

$$E(B)_{FL} = \frac{E(B)_{AMB,min}}{R(B)_W} - E(B)_{AMB} \text{ if } E(B)_{AMB} \leq E(B)_{AMB,min}$$

where $E(R)_{FL}$, $E(G)_{FL}$, and $E(B)_{FL}$ are levels of trichromatic irradiance provided by the frontlight unit in the red, green, and blue channels, respectively; $E(R)_{AMB}$, $E(G)_{AMB}$, and $E(B)_{AMB}$ are the detected levels of ambient trichromatic irradiance incident on the viewing surface in the red, green, and blue channels, respectively; $E(R)_{AMB, MIN}$, $E(G)_{AMB, MIN}$, and $E(B)_{AMB}$, MIN are the predetermined threshold levels in the red, green, and blue channels, respectively; and R(R)w, R(G)w, and R(B)w is the diffuse reflectance factor of the viewing surface in a white state in the red, green, and blue channels, respectively.

8. The electrophoretic display apparatus of claim 1, wherein the frontlight illuminance incident on the viewing surface from the frontlight unit is controlled in step (d) according to:

$$E(R)_{FL} = E(R)_{AMB}\left(\frac{1}{R(R)_W} - 1\right) \text{ if } E(R)_{AMB} > E(R)_{AMB,min}$$

$$E(G)_{FL} = E(G)_{AMB}\left(\frac{1}{R(G)_W} - 1\right) \text{ if } E(G)_{AMB} > E(G)_{AMB,min}$$

$$E(B)_{FL} = E(B)_{AMB}\left(\frac{1}{R(B)_W} - 1\right) \text{ if } E(B)_{AMB} > E(B)_{AMB,min}$$

where $E(R)_{FL}$, $E(G)_{FL}$, and $E(B)_{FL}$ are levels of trichromatic irradiance provided by the frontlight unit in the red, green, and blue channels, respectively; $E(R)_{AMB}$, $E(G)_{AMB}$, and $E(B)_{AMB}$ are the detected levels of ambient trichromatic irradiance incident on the viewing surface in the red, green, and blue channels, respectively; $E(R)_{AMB, MIN}$, $E(G)_{AMB, MIN}$, and $E(B)_{AMB, MIN}$ are the predetermined threshold levels in the red, green, and blue channels, respectively; and R(R)w, R(G)w, and R(B)w is the diffuse reflectance factor of the viewing surface in a white state in the red, green, and blue channels, respectively.

9. The electrophoretic display apparatus of claim 8, wherein $E(R)_{AMB, MIN}$, $E(G)_{AMB, MIN}$, and $E(B)_{AMB, MIN}$ are determined from $E(G)_{AMB,min}$.

10. The electrophoretic display apparatus of claim 1, wherein:
the one or more ambient light sensors include at least one multispectral sensor with more than three spectral channels; and
the frontlight unit includes at least one multispectral frontlight with more than three independently controlled spectral channels for changing the chrominance of the frontlight illumination.

11. The electrophoretic display apparatus of claim 1, wherein the electrophoretic device comprises:
a light-transmissive electrode at a viewing surface;
a back electrode; and
an electrophoretic medium disposed between the light-transmissive electrode and the back electrode comprising:
a non-polar fluid; and
a multi-pigment particle system dispersed in the non-polar fluid.

12. The electrophoretic display apparatus of claim 1, wherein the frontlight unit comprises a waveguide, a light source for injecting light into the waveguide, and a frustrator for distributing the light from the waveguide on the viewing surface.

13. An electrophoretic display apparatus, comprising:
an electrophoretic device having a viewing surface;
a drive system coupled to the electrophoretic device for driving the electrophoretic device among a plurality of optical states;
one or more ambient light sensors at the viewing surface of the electrophoretic device including at least one trichromatic sensor for detecting ambient trichromatic irradiance in red, green, and blue color channels incident on the viewing surface;

a frontlight unit disposed above the viewing surface of the electrophoretic device for illuminating the viewing surface, including at least one trichromatic light source comprising independently controllable red, green, and blue color channels;

a frontlight control system coupled to the one or more ambient light sensors and the frontlight unit to control the chrominance of illumination from the at least one trichromatic light source to compensate for white states of the electrophoretic device that are off-white, the frontlight control system being configured to:

(a) receive, from the one or more ambient light sensors, one or more signals indicating a detected level of ambient trichromatic irradiance in the red, green, and blue color channels incident on the viewing surface;

(b) compare the detected level of ambient trichromatic irradiance to a predetermined threshold level in each of the red, green, and blue color channels;

(c) when the detected level of ambient trichromatic irradiance is less than or equal to the predetermined threshold level in any of the red, green, and blue color channels, control the frontlight illuminance incident on the viewing surface from the frontlight unit in that channel to adaptively maintain a constant level of trichromatic irradiance comprising the trichromatic irradiance reflected by the viewing surface from the frontlight illuminance and the ambient trichromatic irradiance, irrespective of the detected level of the ambient trichromatic irradiance;

(d) when the detected level of ambient trichromatic irradiance is greater than the predetermined threshold level in any of the red, green, and blue color channels, control the frontlight illuminance incident on the viewing surface from the frontlight unit in that channel to maintain the viewing surface trichromatic irradiance at generally the same level as an ideal Lambertian reflector under the same detected level of ambient trichromatic irradiance; and (e) repeat steps (a) through (d) a plurality of times.

14. An electrophoretic display apparatus, comprising:

an electrophoretic device having a viewing surface;

a drive system coupled to the electrophoretic device for driving the electrophoretic device among a plurality of optical states;

one or more ambient light sensors at the viewing surface of the electrophoretic device including at least one multispectral sensor with more than three spectral channels;

a frontlight unit disposed above the viewing surface of the electrophoretic device for illuminating the viewing surface, including at least one multispectral frontlight with more than three independently controlled spectral channels;

a frontlight control system coupled to the one or more ambient light sensors and the frontlight unit to control the spectral irradiance from the at least one at least one multispectral frontlight, the frontlight control system being configured to:

(a) receive, from the one or more ambient light sensors, one or more signals indicating a detected level of ambient spectral irradiance in the spectral channels incident on the viewing surface;

(b) compare the detected level of ambient spectral irradiance to a predetermined threshold level in each of the spectral channels;

(c) when the detected level of ambient spectral irradiance is less than or equal to the predetermined threshold level in any of the spectral channels, control the frontlight illuminance incident on the viewing surface from the frontlight unit in that channel to adaptively maintain a constant level of spectral irradiance comprising the spectral irradiance reflected by the viewing surface from the frontlight illuminance and the ambient spectral irradiance, irrespective of the detected level of the ambient spectral irradiance;

(d) when the detected level of ambient spectral irradiance is greater than the predetermined threshold level in any of the spectral channels, control the frontlight illuminance incident on the viewing surface from the frontlight unit in that channel to maintain the viewing surface spectral irradiance at generally the same level as an ideal Lambertian reflector under the same detected level of ambient spectral irradiance; and (e) repeat steps (a) through (d) a plurality of times.

15. An electrophoretic display apparatus, comprising:

an electrophoretic device having a viewing surface;

a drive system coupled to the electrophoretic device for driving the electrophoretic device among a plurality of optical states;

one or more ambient light sensors at the viewing surface of the electrophoretic device for detecting a level of ambient illuminance incident on the viewing surface;

a frontlight unit disposed above the viewing surface of the electrophoretic device for illuminating the viewing surface; and a frontlight control system coupled to the one or more ambient light sensors and the frontlight unit, and configured to:

(a) receive, from the one or more ambient light sensors, one or more signals indicating a detected level of ambient illuminance incident on the viewing surface of the electrophoretic device;

(b) compare the detected level of ambient illuminance to a predetermined threshold level;

(c) when the detected level of ambient illuminance is less than or equal to the predetermined threshold level, control frontlight illuminance incident on the viewing surface from the frontlight unit to adaptively maintain a constant viewing surface luminance comprising light reflected by the viewing surface from the frontlight illuminance and the ambient illuminance, irrespective of the detected level of the ambient illuminance;

(d) when the detected level of ambient illuminance is greater than the predetermined threshold level, control the frontlight illuminance incident on the viewing surface from the frontlight unit to maintain the viewing surface luminance at generally the same level as a white diffuse reflector under the same detected level of ambient illuminance, wherein the white diffuse reflector comprises a Lambertian reflective surface having a value of $L^*=100$; and (e) repeat steps (a) through (d) a plurality of times;

wherein the one or more ambient light sensors include at least one multispectral sensor with more than three spectral channels; and the frontlight unit includes at least one multispectral frontlight with more than three independently controlled spectral channels for changing the chrominance of the frontlight illumination;

wherein the frontlight control system is further configured to (f) receive, from the one or more ambient light sensors, one or more signals indicating a detected level of ambient spectral irradiance in the spectral channels incident on the viewing surface;

(g) compare the detected level of ambient spectral irradiance to a predetermined threshold level in each of the spectral channels;

(h) when the detected level of ambient spectral irradiance is less than or equal to the predetermined threshold level in any of the spectral channels, control the frontlight illuminance incident on the viewing surface from the frontlight unit in that channel to adaptively maintain a constant level of spectral irradiance comprising the spectral irradiance reflected by the viewing surface from the frontlight illuminance and the ambient spectral irradiance, irrespective of the detected level of the ambient spectral irradiance;

(i) when the detected level of ambient spectral irradiance is greater than the predetermined threshold level in any of the spectral channels, control the frontlight illuminance incident on the viewing surface from the frontlight unit in that channel to maintain the viewing surface spectral irradiance at generally the same level as an ideal Lambertian reflector under the same detected level of ambient spectral irradiance; and (j) repeat steps (f) through (i) a plurality of times.

16. The electrophoretic display apparatus of claim 15, wherein the frontlight illuminance incident on the viewing surface from the frontlight unit is controlled in step (c) according to:

$$E_{FL}(\lambda) = \begin{cases} E_{AMB}(\lambda)\left(\dfrac{1}{R_W(\lambda)} - 1\right) & \text{if } E_{AMB}(\lambda) > E_{AMB,min}(\lambda) \\ \dfrac{E_{AMB,min}(\lambda)}{R_W(\lambda)} - E_{AMB}(\lambda) & \text{if } E_{AMB}(\lambda) \le E_{AMB,min}(\lambda) \end{cases}$$

where $E_{FL}(\lambda)$ is the illuminance incident on the viewing surface from the frontlight unit in the spectral channels; $E_{AMB}(\lambda)$ are the detected levels of ambient spectral irradiance incident on the viewing surface in the spectral channels; and $R_W(\lambda)$ is the diffuse reflectance factor of the viewing surface in a white state in the spectral channels.

17. The electrophoretic display apparatus of claim 16, wherein $E_{AMB,min}$ is determined from $E_{AMB,min}(\lambda)$ using the photopic luminous efficiency function $V(\lambda)$:

$$E_{AMB,min} = 638 \int E_{AMB,min}(\lambda) V(\lambda) d\lambda.$$

18. The electrophoretic display apparatus of claim 16, wherein $E_{AMB,min}(\lambda)$ is determined at the ambient illuminance threshold level $E_{AMB,min}$ of about 94 lx.

19. The electrophoretic display apparatus of claim 16, wherein $E_{AMB,min}(\lambda)$ is determined at the ambient illuminance threshold level $E_{AMB,min}$ between 3 lx and 500 lx.

* * * * *